United States Patent
Kim et al.

(10) Patent No.: US 12,266,165 B2
(45) Date of Patent: Apr. 1, 2025

(54) ELECTRONIC DEVICE FOR PERFORMING VIDEO QUALITY ASSESSMENT, AND OPERATION METHOD OF THE ELECTRONIC DEVICE

(71) Applicant: SAMSUNG ELECTRONICS CO., LTD., Suwon-si (KR)

(72) Inventors: Wookhyung Kim, Suwon-si (KR); Anant Baijal, Suwon-si (KR); Cheulhee Hahm, Suwon-si (KR); Namuk Kim, Suwon-si (KR); Jayoon Koo, Suwon-si (KR); Ilhyun Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 350 days.

(21) Appl. No.: 17/824,587

(22) Filed: May 25, 2022

(65) Prior Publication Data
US 2022/0392210 A1 Dec. 8, 2022

Related U.S. Application Data

(63) Continuation of application No. PCT/KR2022/007253, filed on May 20, 2022.

(30) Foreign Application Priority Data

May 25, 2021 (KR) .................. 10-2021-0067016
Dec. 28, 2021 (KR) .................. 10-2021-0190392

(51) Int. Cl.
*G06V 10/98* (2022.01)
*G06N 3/045* (2023.01)
(Continued)

(52) U.S. Cl.
CPC .......... *G06V 10/993* (2022.01); *G06N 3/045* (2023.01); *G06V 10/82* (2022.01); *G06V 20/40* (2022.01)

(58) Field of Classification Search
CPC ...... G06V 10/993; G06V 10/82; G06V 20/40; G06N 3/045; G06N 3/0464; G06N 3/09
See application file for complete search history.

(56) References Cited

U.S. PATENT DOCUMENTS

| 8,532,414 B2 | 9/2013 | Wang et al. |
| 10,699,396 B2 | 6/2020 | Aydin et al. |

(Continued)

FOREIGN PATENT DOCUMENTS

| KR | 101279705 B1 | 6/2013 |
| KR | 1020190076288 A | 7/2019 |

(Continued)

OTHER PUBLICATIONS

International Search Report (PCT/ISA/210) issued Aug. 17, 2022 by the International Searching Authority in International Application No. PCT/KR2022/007253.

*Primary Examiner* — Jianxun Yang
(74) *Attorney, Agent, or Firm* — Sughrue Mion, PLLC

(57) ABSTRACT

An electronic device is provided. The electronic device includes a memory storing one or more instructions, and a processor configured to execute the one or more instruction stored in the memory. The processor is configured to execute the one or more instructions to obtain a subjective assessment score for each of a plurality of sub-regions included in an input frame, the subjective assessment score being a Mean Opinion Score (MOS); obtain a location weight for each of the plurality of sub-regions, the location weight indicating characteristics according to a location of a display; obtain a weighted assessment score for each of the plurality of sub-regions, based on the subjective assessment (Continued)

score for each of the plurality of sub-regions and the location weight for each of the plurality of sub-regions; and obtain a final quality score for the entire video frame, based on the weighted assessment score for each of the plurality of sub-regions.

20 Claims, 13 Drawing Sheets

(51) Int. Cl.
*G06V 10/82* (2022.01)
*G06V 20/40* (2022.01)

(56) References Cited

U.S. PATENT DOCUMENTS

| | | |
|---|---|---|
| 2013/0027568 A1 | 1/2013 | Zou et al. |
| 2013/0265451 A1* | 10/2013 | Son .................. H04N 23/62 |
| | | 348/207.1 |
| 2017/0019454 A1 | 1/2017 | Almohamedh |
| 2017/0177975 A1* | 6/2017 | Yu ................. G06F 18/21355 |
| 2020/0145661 A1 | 5/2020 | Jeon et al. |
| 2021/0097667 A1* | 4/2021 | Barua ................ G06V 40/18 |
| 2022/0138904 A1 | 5/2022 | Kim et al. |

FOREIGN PATENT DOCUMENTS

| | | |
|---|---|---|
| KR | 10-2020-0016879 A | 2/2020 |
| KR | 1020200044652 A | 4/2020 |
| KR | 1020210009258 A | 1/2021 |

* cited by examiner

ELECTRONIC DEVICE FOR PERFORMING VIDEO QUALITY ASSESSMENT, AND OPERATION METHOD OF THE ELECTRONIC DEVICE

CROSS-REFERENCE TO RELATED APPLICATIONS

This application is a continuation application of International Application No. PCT/KR2022/007253, filed on May 20, 2022, which claims benefit of priority to Korean Patent Application No. 10-2021-0067016, filed on May 25, 2021, and to Korean Patent Application No. 10-2021-0190392, filed on Dec. 28, 2021, in the Korean Intellectual Property Office, the disclosures of which are incorporated herein in their entireties by reference.

BACKGROUND

1. Technical Field

The disclosure relates to an electronic device for performing video quality assessment, and an operation method of the electronic device, and more particularly, to an electronic device for more accurately assessing the quality of a video in consideration of a region of interest of a user, and an operation method of the electronic device.

2. Description of Related Art

Distortion may occur in video images during a process of generation, compression, storage, transmission, and reproduction. Distorted images must be reproduced within an allowable range of human perception. Therefore, before an image is reproduced, it is necessary to measure and assess image quality perceived by humans, in order to understand how this distortion affects image quality.

Image quality assessment technology may be divided into a subjective quality assessment method and an objective quality assessment method. The subjective quality assessment method may be a method by which an assessor directly watches a video and assesses image quality, and may best reflect the image quality perception characteristics of humans. However, the subjective quality assessment method has a disadvantage in that an assessment value differs for each person, it takes a lot of time and is costly, and it is difficult to consistently assess the quality of an image in real time.

The objective quality assessment method is a method of implementing an algorithm that measures quality perceived by the human optic nerve and assessing a degree of deterioration in the quality of a compressed image by using the algorithm.

The objective quality assessment method includes a full-reference quality assessment method using a reference image that may be compared with a distorted image, a reduced reference quality assessment method that performs quality assessment using partial information about the reference image other than the reference image itself, for example, watermarking or auxiliary channels, and a no-reference quality assessment method that performs quality estimation using only distorted images without using any information of the reference image.

Because the no-reference quality assessment method requires no reference image information, it has an advantage in that the no-reference quality assessment method may be used in any application requiring quality measurement.

SUMMARY

According to an aspect of the disclosure, there is provided an electronic device including: a memory storing one or more instructions; and a processor configured to execute the one or more instructions stored in the memory to: obtain a subjective assessment score for each of a plurality of sub-regions included in an input frame, the subjective assessment score being a Mean Opinion Score (MOS); obtain a location weight for each of the plurality of sub-regions, the location weight indicating characteristics according to a location of a display; obtain a weighted assessment score for each of the plurality of sub-regions, based on the subjective assessment score for each of the plurality of sub-regions and the location weight for each of the plurality of sub-regions; and obtain a final quality score for the entire video frame, based on the weighted assessment score for each of the plurality of sub-regions.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
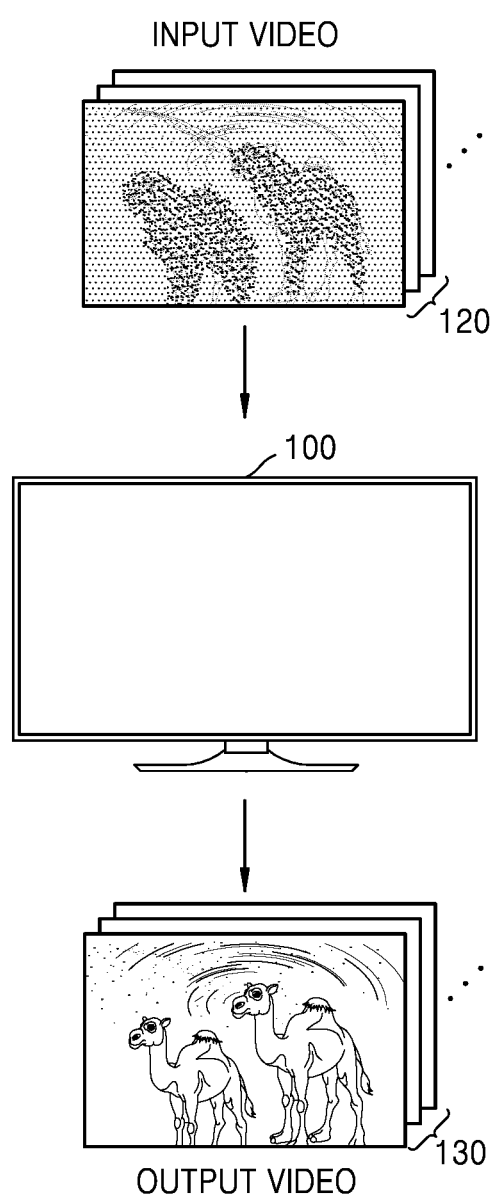
FIG. 1 is a diagram for explaining an electronic device assessing a video quality score, and outputting an image having processed quality on a screen, according to an embodiment of the disclosure.

The processor may be further configured to execute the one or more instructions to predict the subjective assessment score for each of the plurality of sub-regions included in the input frame, by using a first neural network trained to learn, from a video frame received, the subjective assessment score for each of the plurality of sub-regions included in the video frame.

The first neural network may be trained to allow the subjective assessment score for each of the plurality of sub-regions included in the video frame to be equal to a Ground Truth (GT) subjective assessment score for the entire video frame, the GT subjective assessment score being a GT MOS.

The processor may be further configured to execute the one or more instructions to predict the location weight for each of the plurality of sub-regions from the subjective assessment score for each of the plurality of sub-regions by using a second neural network, and the second neural network is a neural network trained to predict a weight corresponding to a difference between the subjective assessment score for each sub-region and the GT subjective assessment score for the entire video frame as the location weight for each sub-region, from the subjective assessment score for each of the plurality of sub-regions included in the video frame predicted through the first neural network.

The second neural network may be trained to allow a mean value of weighted assessment scores obtained by multiplying the subjective assessment score for each of the plurality of sub-regions included in the video frame by the location weight to be equal to the GT subjective assessment score for the entire video frame.

The processor may be further configured to execute the one or more instructions to obtain the location weight for each of the plurality of sub-regions from the memory.

The location weight for each of the plurality of sub-may be is predicted through a second neural network and stored in the memory, and the second neural network may be trained to predict a weight corresponding to a difference between the subjective assessment score for each sub-region and the GT subjective assessment score for the entire video frame is predicted as the location weight for each sub-region, from the subjective assessment score for each of the plurality of sub-regions included in the video frame received, and may be trained to allow a mean value of weighted assessment scores obtained by multiplying the subjective assessment score for each of the plurality of sub-regions by the location weight to be equal to the GT subjective assessment score for the entire video frame.

The processor may be further configured to execute the one or more instructions to obtain the weighted assessment score for each respective sub-region of the plurality of sub-regions by multiplying the subjective assessment score for the respective sub-region by the location weight for the respective sub-region.

The processor may be further configured to execute the one or more instructions to: obtain high-complexity information indicating a region of interest from the video frame; and obtain the final quality score for the entire input frame based on the weighted assessment score and the high-complexity information.

The high-complexity information may include at least one of speaker identification information, semantic segmentation information, object detection information, or saliency map information.

According to an aspect of the disclosure, there is provided a video quality assessment method performed by an electronic device, the video quality assessment method including: obtaining a subjective assessment score for each of a plurality of sub-regions included in an input frame, the subjective assessment score being a Mean Opinion Score (MOS); obtaining a location weight for each of the plurality of sub-regions, the location weight indicating characteristics according to a location of a display; obtaining a weighted assessment score for each of the plurality of sub-regions, based on the subjective assessment score for each of the plurality of sub-regions and the location weight for each of the plurality of sub-regions; and obtaining a final quality score for the entire video frame, based on the weighted assessment score for each of the plurality of sub-regions.

The obtaining of the subjective assessment score for each of the plurality of sub-regions included in the input frame may include predicting the subjective assessment score for each of the plurality of sub-regions, by using a first neural network trained to learn, from a video frame received, the subjective assessment score for each of the plurality of sub-regions included in the video frame.

The first neural network may be trained to allow the subjective assessment score for each of the plurality of sub-regions included in the video frame to be equal to a Ground Truth (GT) subjective assessment score for the entire video frame, the GT subjective assessment score being a GT MOS.

The obtaining of the location weight for each of the plurality of sub-regions may include predicting the location weight for each of the plurality of sub-regions from the subjective assessment score for each of the plurality of sub-regions by using a second neural network, and the second neural network may be trained to predict a weight corresponding to a difference between the subjective assessment score for each sub-region and the GT subjective assessment score for the entire video frame as the location weight for each sub-region, from the subjective assessment score for each of the plurality of sub-regions predicted through the first neural network.

The second neural network may be trained to allow a mean value of weighted assessment scores obtained by multiplying the subjective assessment score for each of the plurality of sub-regions included in the video frame by the location weight to be equal to the GT subjective assessment score for the entire video frame.

The obtaining of the location weight for each of the plurality of sub-regions may include obtaining the location weight for each of the plurality of sub-regions from a memory included in the electronic device.

The video quality assessment method may further include predicting the location weight for each of the plurality of sub-regions through a second neural network and storing the location weight for each of the plurality of sub-regions in the memory, and the second neural network may be trained to predict a weight corresponding to a difference between the subjective assessment score for each sub-region and the GT subjective assessment score for the entire video frame as the location weight for each sub-region from the subjective assessment score for each of the plurality of sub-regions included in the video frame received, and may be trained to allow a mean value of weighted assessment scores for each of the plurality of sub-regions obtained by multiplying the subjective assessment score for each of the plurality of sub-regions by the location weight to be equal to the GT subjective assessment score for the entire video frame.

The obtaining of the weighted assessment score for each of the plurality of sub-regions may include obtaining the weighted assessment score for each respective sub-region of the plurality of sub-regions by multiplying the subjective assessment score for the respective sub-region by the location weight for the respective sub-region.

The video quality assessment method may further include obtaining high-complexity information indicating a region of interest from the input frame, and the obtaining of the final quality score includes obtaining the final quality score for the entire input frame based on the weighted assessment score and the high-complexity information.

According to an aspect of the disclosure, there is provided a computer-readable recording medium having recorded thereon a program for executing a video quality assessment method, the video quality assessment method including: obtaining a subjective assessment score for each of a plurality of sub-regions included in an input frame; obtaining a location weight for each of the plurality of sub-regions, the location weight indicating characteristics according to a location of a display; obtaining a weighted assessment score for each of the plurality of sub-regions, based on the subjective assessment score for each of the plurality of sub-regions and the location weight for each of the plurality of sub-regions; and obtaining a final quality score for the entire video frame, based on the weighted assessment score for each of the plurality of sub-regions.

Throughout the disclosure, the expression "at least one of a, b or c" indicates only a, only b, only c, both a and b, both a and c, both b and c, all of a, b, and c, or variations thereof.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein.

Although general terms widely used at present were selected for describing the disclosure in consideration of the functions thereof, these general terms may vary according to intentions of one of ordinary skill in the art, case precedents, the advent of new technologies, or the like. Hence, the terms must be defined based on their meanings and the contents of the entire specification, not by simply stating the terms.

The terms used in the present specification are merely used to describe particular embodiments, and are not intended to limit the scope of the disclosure.

Throughout the specification, when an element is referred to as being "connected" or "coupled" to another element, it can be directly connected or coupled to the other element, or can be electrically connected or coupled to the other element with intervening elements interposed therebetween.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment.

Embodiments of the disclosure may be described in terms of functional block components and various processing steps. Some or all of these functional blocks may be implemented using various numbers of hardware and/or software configurations that perform specific functions. For example, the functional blocks of the disclosure may be implemented by one or more microprocessors, or by circuit configurations for a certain function. For example, the functional blocks of the disclosure may be implemented in various programming or scripting languages. The functional blocks may be implemented as algorithms executed in one or more processors. The disclosure may employ the conventional art for electronic configuration, signal processing, and/or data processing, for example. The words "mechanism," "element," "means," and "configuration" are used broadly and are not limited to mechanical or physical embodiments, Furthermore, the connecting lines or connectors between components shown in the various figures presented are intended to represent exemplary functional relationships and/or physical or logical couplings between the components. In an actual device, a connection between components may be represented by various functional connections, physical connections, or circuit connections that are replaceable or added.

The terms "unit", "-er (-or)", and "module" when used in this specification refers to a unit in which at least one function or operation is performed, and may be implemented as hardware, software, or a combination of hardware and software.

The term "user" used herein denotes a person who controls a function or operation of an electronic apparatus by using the electronic apparatus. Examples of the user may include a viewer or a consumer who watches a video by using an electronic apparatus. Examples of the user may also include a manager or an installation engineer.

The disclosure will now be described more fully with reference to the accompanying drawings, in which exemplary embodiments are shown.

FIG. 1 is a diagram for explaining an electronic device 100 assessing a video quality score, and outputting an image having a processed quality on a screen, according to an embodiment of the disclosure.

Referring to FIG. 1, the electronic device 100 may be an electronic device capable of processing an image and outputting a processed image. The electronic device 100 may be implemented by using various types of electronic devices including displays. The electronic device 100 may be fixed or movable, and may be, but is not limited to, a digital TV capable of digital broadcasting reception.

The electronic device 100 may include at least one of a desktop personal computer (PC), a smartphone, a tablet PC, a mobile phone, a video phone, an e-book reader, a laptop PC, a netbook computer, a digital camera, a personal digital assistant (PDA), a portable multimedia player (PMP), a camcorder, a navigation wearable device, a smart watch, a home network system, a security system, or a medical device.

The electronic device 100 may be implemented as not only a flat display apparatus but also a curved display apparatus having a curvature or a flexible display apparatus with an adjustable curvature. Examples of an output resolution of the electronic device 100 may include any of various resolutions such as a high definition (HD), a full HD, an ultra HD, or a resolution that is clearer than an ultra HD.

The electronic device 100 may output a video. The video may be composed of a plurality of frames. The video may include items such as TV programs provided by content providers or various movies or dramas through video on demand (VOD) services. The content provider may refer to a terrestrial broadcasting station or cable broadcasting station, or an over-the-top (OTT) service provider or an internet protocol television (IPTV) service provider that provides various contents including video to consumers.

The video is captured, compressed, and transmitted to the electronic device 100, and is reconstructed and output by the electronic device 100. Due to, for example, the limitation of the physical characteristics of a device used to capture the video and a limited bandwidth, information is lost, which causes distortion of the video. The distorted video may deteriorate in quality.

According to an embodiment, the electronic device 100 may include a video quality assessment module. The video quality assessment module may objectively assess the quality of a video and/or image by using an Image Quality Assessment (IQA) technology and/or a Video Quality Assessment (VQA) technology.

According to an embodiment of the disclosure, the video quality assessment module may objectively assess the quality of a video and/or image in a no-reference quality assessment method.

The video quality assessment module may be implemented as at least one hardware chip that is mounted on the electronic device 100 or included in the electronic device 100. Alternatively, the video quality assessment module may be implemented as a software module included in the electronic device 100.

According to an embodiment of the disclosure, the electronic device 100 may perform a video quality assessment method by using the video quality assessment module included in the electronic device 100. The electronic device 100 may first assess the quality of the video by using the video quality assessment module, before outputting an input frame 120 included in the video to a screen. The electronic device 100 may assess the quality of each of the plurality of frames included in the video to thereby obtain a score for each of the plurality of frames.

According to an embodiment of the disclosure, the electronic device 100 may include a memory for storing one or more instructions and a processor for executing the one or more instructions stored in the memory to obtain a subjective assessment score, namely, a mean opinion score (MOS), for each of a plurality of sub-regions included in the input frame, obtain, for each of the plurality of sub-regions, a location weight indicating characteristics according to the location of a display, obtain a weighted assessment score, based on the subjective assessment score and the location weight, and obtain a final quality score for the entire input frame, based on the weighted assessment score.

According to an embodiment of the disclosure, the electronic device 100 may obtain a quality score of a frame by using an artificial intelligence (AI) technology. The AI technology may be composed of machine learning (deep learning) and element technologies using machine learning. The AI technology may be implemented using an algorithm. Here, the algorithm or a set of algorithms for implementing the AI technology is called a neural network. The neural network may receive input data, perform an operation for analysis and classification, and output result data.

According to an embodiment of the disclosure, the electronic device 100 may divide an input frame 120 into a plurality of sub-regions, and may obtain a model-based quality score for each of the plurality of sub-regions by using at least one neural network.

According to an embodiment of the disclosure, the at least one neural network may be a model previously trained for video quality assessment.

According to an embodiment of the disclosure, the at least one neural network may be a neural network that has learned the MOS. The subjective assessment score is obtained through a subjective assessment of human, and may refer to a mean score obtained by synthesizing individual parameters with respect to a video quality assessed by multiple assessors. The subjective assessment score may be referred to as an MOS.

In general, the subjective assessment score may be obtained by a plurality of assessors assessing the quality of a video in units of frames. Hereinafter, for convenience of descriptions, a neural network that receives a video frame and learns a subjective assessment score obtained by assessors assessing the video frame will be referred to as a first neural network.

According to an embodiment of the disclosure, the first neural network may be a neural network that receives a video frame and has learned a subjective assessment score, namely, an MOS, for each sub-region of the video frame. According to an embodiment of the disclosure, the electronic device 100 may predict a subjective assessment score for each of a plurality of sub-regions included in an input frame, by using the first neural network.

According to an embodiment of the disclosure, a subjective assessment score predicted for each sub-region of a video frame may be different than a subjective assessment score obtained by assessors assessing the entire video frame. The subjective assessment score obtained by assessors assessing the entire video frame may be called a Ground Truth Mean Opinion Score (GT MOS). The GT MOS, namely, a correct answer set, may refer to information known to be real or factual or targeted information, provided by direct observation and/or measurement, unlike information provided by inference.

According to an embodiment of the disclosure, the first neural network may use, as a correct answer set, a subjective assessment score obtained by assessors assessing the entire video frame, when predicting a subjective assessment score for each sub-region. In other words, the first neural network may be trained so that the subjective assessment score predicted for each sub-region is equal to a GT MOS for the entire frame.

When the electronic device 100 obtains a final quality score for the frame by using only the first neural network, the electronic device 100 obtains a mean value for the entire frame from the subjective assessment scores for each sub-region predicted through the first neural network, and uses the mean value as the final quality score for the frame. However, when the mean value for the entire frame obtained from the subjective assessment score for each sub-region is used as the final quality score, there may be a problem in that the final quality score differs from assessment scores for a region of interest obtained by the assessors.

Because people usually tend to look at the center portion of a screen more than the edge portions thereof, the center portion of a screen is usually a region of interest. Because assessors primarily view and assess the region of interest when assessing a video, an assessment score for the region of interest needs to be similar to an assessment score for the entire frame. However, when the subjective assessment scores for all of the plurality of sub-regions are averaged, because the assessment score for a region other than the region of interest is also used in a mean value calculation, the assessment score for the entire frame is different from the assessment score for the region of interest.

A first neural network is trained by not using, as the GT MOS, the subjective assessment score for each sub-region obtained by the assessors assessing each sub-region, but instead by using, as the GT MOS for each sub-region, the subjective assessment score obtained by the assessors assessing the entire frame.

Because the GT MOS used by the first neural network for training is the same score as the assessment score for the entire frame, not the subjective assessment score for each sub-region, the first neural network does not reflect characteristics that an assessment score varies depends on the location of a display.

According to an embodiment of the disclosure, the electronic device 100 may use a location weight indicating characteristics according to the location of the display so that the characteristics that a region of interest drawing a user's attention depends on the location of the display is reflected in an assessment score.

According to an embodiment of the disclosure, the electronic device 100 may obtain a location weight for each of the plurality of sub-regions from the subjective assessment score for each of the plurality of sub-regions by using at least one neural network. For convenience of description, a neural network trained to obtain the location weight according to the location of the display from the subjective assessment score for each of the plurality of sub-regions will be referred to as a second neural network.

According to an embodiment of the disclosure, the second neural network may be a neural network trained to receive, as input data, the subjective assessment score for each of the plurality of sub-regions included in the video frame, which is predicted through the first neural network, and predict a weight corresponding to a difference between the subjective assessment score for each sub-region and the GT MOS for the entire video frame as the location weight for each sub-region.

According to an embodiment of the disclosure, the second neural network may be a neural network trained so that a mean value of weighted assessment scores obtained by multiplying the subjective assessment score for each of the plurality of sub-regions included in the video frame by the location weight is equal to the GT MOS for the entire video frame.

According to another embodiment of the disclosure, the location weight may be pre-stored in the electronic device 100. A manufacturer of the electronic device 100 may predict a location weight matrix including a location weight for each sub-region by using the second neural network and store the location weight matrix in advance in a memory or the like in the electronic device 100.

According to an embodiment of the disclosure, the electronic device 100 may obtain a weighted assessment score, based on a subjective assessment score and a location weight. According to an embodiment of the disclosure, the weighted assessment score for each sub-region may be obtained by applying a location-based weight for each sub-region to the subjective assessment score for each sub-region, e.g., by multiplying the subjective assessment score for each sub-region by a location-based weight for each sub-region. The electronic device 100 may obtain a subjective assessment score matrix including the subjective assessment score for each sub-region and a location weight matrix including the location weight for each sub-region, and may obtain a weighted assessment score by multiplying the subjective assessment score matrix by the location weight matrix.

According to an embodiment of the disclosure, the electronic device 100 may obtain the final quality score for the entire input frame by averaging the weighted assessment score for each sub-region. Thus, according to an embodiment, because the electronic device 100 obtains the final quality score by averaging the weighted assessment score considering the location weight instead of averaging the subjective assessment score for each sub-region, the electronic device 100 may obtain a final quality score in which a region of interest of a user according to a location has been reflected.

According to an embodiment of the disclosure, the electronic device 100 may obtain high-complexity information about the region of interest from the input frame. When the electronic device 100 obtains the high-complexity information, the electronic device 100 may obtain the final quality score for the input frame by taking into account both the weighted assessment score for each sub-region and the high-complexity information.

According to an embodiment of the disclosure, the region of interest may refer to a region that attracts attention of a user or viewer using the electronic device 100. According to an embodiment of the disclosure, information about the region of interest may include low-complexity information such as a location weight indicating characteristics for each location of the display. According to an embodiment of the disclosure, the information about the region of interest may also include high-complexity information requiring a high amount of computation and a high cost. The high-complexity information may include, for example, at least one of speaker identification information, semantic segmentation information, object detection information, or saliency map information obtained from the input frame.

According to an embodiment of the disclosure, the obtainment of the high-complexity information may vary according to model specifications, capacity, performance, etc. of the electronic device 100. For example, when the electronic device 100 has a large-capacity memory, a high-performance central processing unit (CPU), and the like embedded therein, the electronic device 100 may obtain the high-complexity information from the input frame and may use the high-complexity information to obtain the final quality score. Alternatively, when the user determines whether to obtain high-complexity information from a setting menu of the electronic device 100 by using a user interface or the like, the electronic device 100 may determine whether to use the high-complexity information according to a user's selection when performing quality improvement.

According to an embodiment of the disclosure, pieces of information included in the high-complexity information may be assigned different importances with different weights, respectively. When each importance is given to the high-complexity information, the electronic device 100 may multiply each of the pieces of information included in the high-complexity information by a weight according to the importance of each of the pieces of information, and may obtain the final quality score in consideration of a product of the multiplication together with the weighted assessment score for each sub-region.

As described above, according to an embodiment of the disclosure, the electronic device 100 may generate a location weight by using characteristics according to the location of the display, and may obtain the final quality score in consideration of the location weight together with the subjective assessment score for each sub-region. Accordingly, because the electronic device 100 obtains the final quality score for the frame in consideration of a region of interest according to the location of a screen, the electronic device 100 may more accurately obtain a quality score of the frame.

The electronic device 100 may accumulate a score obtained for each frame with respect certain frames for a certain period of time to thereby obtain a final quality score for the video including the plurality of frames.

According to an embodiment of the disclosure, the electronic device 100 may perform image quality processing with respect to the frames included in the video according to the final quality score. In FIG. 1, the electronic device 100 may improve both the input frame 120 and an output frame 130, based on the final quality score. The electronic device 100 may output the output frame 120 through the display.

According to another embodiment of the disclosure, the video quality assessment module may be implemented as a separate device from the electronic device 100, without being included in the electronic device 100. In other words, the electronic device 100 may communicate with the video quality assessment module via a communication network. In this case, the electronic device 100 may transmit the video to an external video quality assessment module via the communication network. The video quality assessment module may receive the video including the plurality of frames from the electronic device 100, and may obtain a model-based quality score for each of a plurality of sub-regions included in each frame, by using a neural network that has learned a subjective assessment score, namely, an MOS, for the frames.

The video quality assessment module may receive information about the display included in the electronic device 100 from the electronic device 100. The information about the display may include information about at least one of a size or a location of the display. The video quality assessment module may obtain a location weight indicating characteristics for each location of the display from the information about the display, and may obtain a weighted assessment score for each sub-region in consideration of the location weight together with the model-based subjective assessment score for each sub-region.

The video quality assessment module may obtain a quality score of the entire frame, based on a subjective assessment score to which the location weight has been applied, and may obtain a quality score for the entire video by accumulating time-series data for the plurality of frames.

The video quality assessment module may obtain the high-complexity information from the input frame. In this case, the video quality assessment module may apply the high-complexity information for each sub-region to the weighted assessment score. The video quality assessment module may obtain a quality score of the entire frame based on the high-complexity information and the weighted assessment score, and accumulate the quality score for the plurality of frames to thereby obtain a quality score for the entire video.

The video quality assessment module may transmit the obtained score to the electronic device 100 through the communication network. The electronic device 100 may process and output the quality of the video, based on the score received from the video quality assessment module.

Alternatively, the video quality assessment module may directly process the quality of the video, based on the obtained score, and then may transmit the processed quality of the video to the electronic device 100. The electronic device 100 may output a video of an improved quality received from the video quality assessment module.

As described above, according to an embodiment of the disclosure, the video quality assessment module may be included in the electronic device 100 or provided outside the electronic device 100 to obtain a weight for each location and correct the model-based quality score, namely, the subjective assessment score for each sub-region, by using the weight for each location, to thereby obtain a quality score in which the user's region of interest according to the location of the display of the electronic device 100 has been better reflected.

Figure 2:
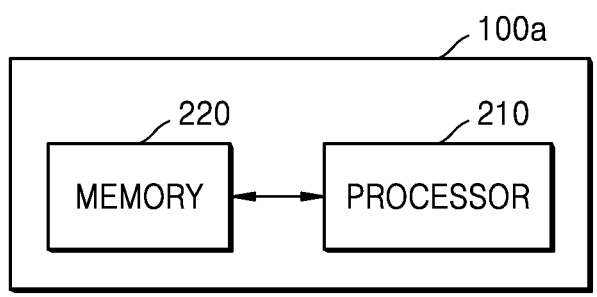
FIG. 2 is a block diagram of an internal structure of an electronic device, according to an embodiment of the disclosure.

FIG. 2 is a block diagram of an internal structure of an electronic device 100*a* according to an embodiment of the disclosure.

Referring to FIG. 2, the electronic device 100*a* may include a processor 210 and a memory 220.

The memory 220 may store at least one instruction. The memory 220 may store at least one program that the processor 210 executes. At least one neural network and/or a pre-defined operation rule or AI model may be stored in the memory 220. The memory 220 may store data that is input to the electronic device 100*a* or output from the electronic device 100*a*.

The memory 220 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

According to an embodiment of the disclosure, the memory 220 may store at least one instruction for performing a video quality assessment method.

According to an embodiment of the disclosure, the memory 220 may include at least one instruction for obtaining a subjective assessment score for each of a plurality of sub-regions.

According to an embodiment of the disclosure, the memory 220 may include at least one instruction for obtaining a location weight indicating characteristics according to the location of the display.

According to an embodiment of the disclosure, the memory 220 may include at least one instruction for obtaining the final assessment score for the input frame, based on the subjective assessment score and the location weight for each of a plurality of sub-regions.

According to an embodiment of the disclosure, at least one neural network and/or a pre-defined operation rule or an AI model may be stored in the memory 220.

According to an embodiment of the disclosure, the memory 220 may store a first neural network that has learned the subjective assessment score for each sub-region from a video frame.

According to an embodiment of the disclosure, the memory 220 may store a second first neural network trained to obtain a weight matrix for each location of the display from the subjective assessment score. Alternatively, according to another embodiment of the disclosure, the memory 220 may store a location weight matrix including the location weight for each sub-region. A manufacturer may obtain a location weight matrix according to the location of the display from the subjective assessment score for each sub-region of the video frame by using the second neural network, and may previously store the location weight matrix obtained through the second neural network in the memory 220.

The processor 210 controls operations of the electronic device 100*a*. The processor 210 may control the electronic device 100*a* to perform a function, by executing the one or more programs stored in the memory 220.

According to an embodiment of the disclosure, the processor 210 may perform quality assessment with respect to a video including a plurality of frames. To this end, the processor 210 may divide a frame into a plurality of sub-regions, and may obtain a model-based quality score for each of the plurality of sub-regions by using the first neural network. The first neural network may be a neural network that has previously learned a subjective assessment score, namely, an MOS, obtained using an assessor's display device.

According to an embodiment of the disclosure, the processor 210 may obtain the location weight matrix. The processor 210 may obtain a pre-stored location weight matrix from the memory 220, or may obtain the location weight for each of the plurality of sub-regions from the subjective assessment score for each of the plurality of sub-regions by using the second neural network stored in the memory 220.

According to an embodiment of the disclosure, the processor 210 may obtain a weighted assessment score for each sub-region by applying the location weight for each sub-region to the subjective assessment score. The processor 210 may obtain a mean score for the entire frame by averaging the weighted assessment scores for all of the sub-regions, and may obtain a final quality score for the entire video by accumulating the mean scores for all of the plurality of frames.

Figure 3:
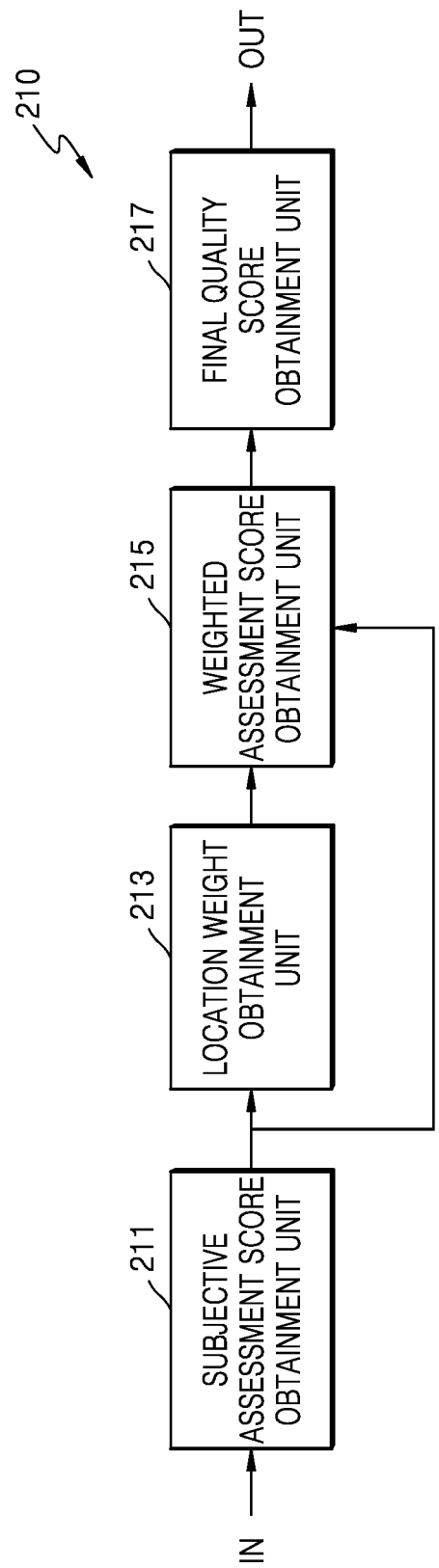
FIG. 3 is a block diagram of an internal structure of a processor of FIG. 2, according to an embodiment of the disclosure.

FIG. 3 is a block diagram of an internal structure of the processor 210 of FIG. 2, according to an embodiment of the disclosure.

Referring to FIG. 3, the processor 210 may include a subjective assessment score obtainment unit 211, a location weight obtainment unit 213, a weighted assessment score obtainment unit 215, and a final quality score obtainment unit 217.

The electronic device 100*a* may receive the video and may divide each frame of the received video into the plurality of sub-regions. Each sub-region may be a region including a predetermined number of pixels. The number of sub-regions or the sizes of each sub-region may be pre-set by the user or the electronic device 100*a* or may be changed according to the frame by the user or the electronic device 100*a*. The user or the electronic device 100*a* may set each frame to be more densely divided or, conversely, to be more coarsely divided, by adjusting the number of sub-regions or the size of each sub-region for each frame.

The frame divided into the plurality of sub-regions may be input to the subjective assessment score obtainment unit 211. The subjective assessment score obtainment unit 211 may receive the frame divided into the plurality of sub-regions as an input signal IN, and may obtain a subjective assessment score from the input signal IN.

According to an embodiment of the disclosure, the subjective assessment score obtainment unit 211 may obtain the subjective assessment score (the MOS) for each sub-region. The MOS is obtained through a subjective assessment of human, and may refer to a mean score obtained by synthesizing individual parameters with respect to a video quality assessed by multiple people. The subjective assessment score obtainment unit 211 sends the subjective assessment score obtained for each sub-region to the location weight obtainment unit 213.

In general, when a person watches a video, the degree to which distortion included in the video is perceived may vary depending on the location of a screen. People usually tend to look at the center portion of a screen more than the edge portions thereof. Therefore, even when the degree of distortion is the same, when there is distortion at the center of the screen and when there is distortion at the edge of the screen, people perceive the degree of distortion differently. The fact that the degree of recognizing the degree of distortion varies according to a region of interest may mean that assessors also provide different assessment scores for a video quality depending on the region of interest. However, because the subjective assessment score for each sub-region obtained by the subjective assessment score obtainment unit 211 is a score predicted to have a similar value to that of the correct answer set for the entire frame, that is, the GT MOS, the subjective assessment score does not reflect the characteristics that an assessment score depends on the location of the sub-region.

According to an embodiment of the disclosure, the location weight obtainment unit 213 may obtain the location weight. The location weight may be information for indicating the characteristics that an assessment score varies according to a location of the display. The location weight may be used to reflect the effect of the characteristics in which a region of interest attracting the user's attention depends on the location of the display upon the quality score.

The location weight obtainment unit 213 may obtain the location weight for each sub-region, and may generate the location weight matrix for the entire frame by using the location weight.

According to an embodiment of the disclosure, the location weight obtainment unit 213 may obtain the location weight for each sub-region from the subjective assessment score for each sub-region received from the subjective assessment score obtainment unit 211. In other words, the location weight may be differently generated according to the subjective assessment score obtained by the subjective assessment score obtainment unit 211.

According to another embodiment of the disclosure, the location weight obtainment unit 213 may obtain the location weight matrix pre-stored in the memory 220. A manufacturer may generate a location weight matrix in consideration of the location of the display and may pre-store the location weight matrix in the memory 220.

The pre-stored location weight matrix may be a matrix including a location weight indicating the characteristics for each location of the display as a fixed value. In this case, the location weight may have a value that is irrelevant to the subjective assessment score received from the subjective assessment score obtainment unit 211.

According to an embodiment of the disclosure, the location weight obtainment unit 213 may correct the location weight obtained for each sub-region by referring to location weights obtained with respect to neighboring sub-regions. For example, the location weight obtainment unit 213 may correct a location weight for a first sub-region by using a location weight of at least one neighboring sub-region adjacent to the first sub-region, for example, at least one neighboring sub-region from among neighboring sub-regions located on the right, left, upper, and lower side of the first sub-region, thereby allowing the location weights of the neighboring sub-regions to become natural values. However, this is an example, and thus the location weight obtainment unit 213 may not take the location weights of the neighboring sub-regions into account.

According to an embodiment of the disclosure, the weighted assessment score obtainment unit 215 may receive the subjective assessment score from the subjective assessment score obtainment unit 211, and may receive the location weight from the location weight obtainment unit 213.

According to an embodiment of the disclosure, the weighted assessment score obtainment unit 215 may obtain the weighted assessment score for each sub-region, based on the subjective assessment score and the location weight.

According to an embodiment of the disclosure, the weighted assessment score obtainment unit 215 may obtain the weighted assessment score for each sub-region by applying the location weight to the subjective assessment score, e.g., by multiplying the subjective assessment score by the location weight. Alternatively, the weighted assessment score obtainment unit 215 may obtain the weighted assessment score for each sub-region by weighted-summing the subjective assessment score and the location weight.

According to an embodiment of the disclosure, the weighted assessment score obtainment unit 215 may transmit the weighted assessment score for each sub-region to the final quality score obtainment unit 217.

According to an embodiment of the disclosure, the final quality score obtainment unit 217 may obtain a mean value of the respective weighted assessment scores for the plurality of sub-regions included in each frame from the weighted assessment score for each sub-region received from the weighted assessment score obtainment unit 215. The final quality score obtainment unit 217 may obtain the mean value of the weighted assessment scores for the plurality of sub-regions by summing all of the weighted assessment scores for the plurality of sub-regions included in each frame and dividing a result of the summation by the number of sub-regions included in the frame.

According to an embodiment of the disclosure, the final quality score obtainment unit 217 may output, as an output signal OUT, the mean value obtained in units of frames, namely, the final quality score for the entire frame.

Figure 4:
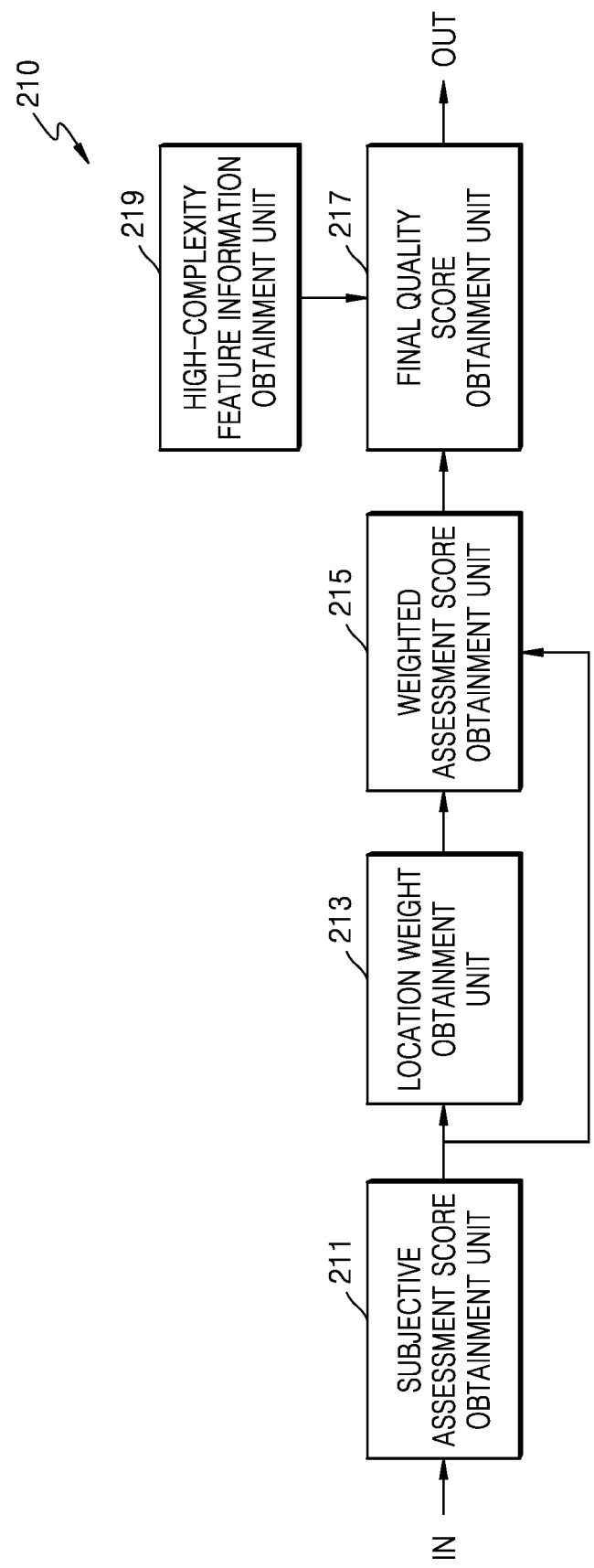
FIG. 4 is a block diagram of an internal structure of the processor of FIG. 2, according to another embodiment of the disclosure.

FIG. 4 is a block diagram of an internal structure of the processor 210 of FIG. 2, according to another embodiment of the disclosure.

Referring to FIG. 4, the processor 210 may further include a high-complexity feature information obtainment unit 219 in addition to the subjective assessment score obtainment unit 211, the location weight obtainment unit 213, the weighted assessment score obtainment unit 215, and the final quality score obtainment unit 217.

The subjective assessment score obtainment unit 211, the location weight obtainment unit 213, the weighted assessment score obtainment unit 215, and the final quality score obtainment unit 217 included in the processor 210 of FIG. 4 perform the same functions as the subjective assessment score obtainment unit 211, the location weight obtainment unit 213, the weighted assessment score obtainment unit 215, and the final quality score obtainment unit 217 included in the processor 210 of FIG. 3, and thus use the same reference numerals as those included in the processor 210 of FIG. 3. A description of FIG. 4 that is the same as given above with reference to FIG. 3 will not be repeated herein.

According to an embodiment of the disclosure, the electronic device 100a may further take high-complexity feature information into account in addition to the location weight in order to obtain a quality score. To this end, the electronic device 100a may further include the high-complexity feature information obtainment unit 219.

The high-complexity feature information obtainment unit 219 may obtain the high-complexity feature information from an input frame.

The aforementioned location weight may be obtained with a relatively low amount of computation and a low complexity. In contrast to this, the high-complexity feature information may refer to information that requires a high amount of computation and a high complexity to obtain a region of interest. The high-complexity feature information may be a high-level feature used to search for the region of interest from the input frame.

According to an embodiment of the disclosure, the high-complexity feature information obtainment unit 219 may obtain an assessment score, i.e., a feature vector representing various high-level features related to quality, from each sub-region of the input frame. The high-level feature related to quality may include at least one of speaker identification information, semantic segmentation information, object detection information, or saliency map information. The high-complexity feature information obtainment unit 219 may obtain the high-complexity weight indicating the high-complexity feature information from a feature related to quality.

According to an embodiment of the disclosure, the high-complexity feature information obtainment unit 219 may obtain speaker identification information. The high-complexity feature information obtainment unit 219 may receive both a video frame and an audio frame and analyze and classify features of the received video frame and the received audio frame to thereby identify a location in a frame where the frame is positioned. The high-complexity feature information obtainment unit 219 may identify a location where a speaker is positioned, and may obtain a high-complexity weight according to the speaker identification information by assigning a high weight to the identified location.

According to an embodiment of the disclosure, the high-complexity feature information obtainment unit 219 may obtain object detection information. The high-complexity feature information obtainment unit 219 may obtain a high-complexity weight according to the object detection information by giving a higher weight to an object included in the frame.

According to an embodiment of the disclosure, the high-complexity feature information obtainment unit 219 may obtain semantic segmentation information. People tend to watch videos in consideration of semantic information of an object included in a frame. This means that the degree of recognizing distortion of an object may vary depending on what object is included in the video frame, that is, the meaning of the object in the video frame. For example, when a video includes a human face and the sky around the human face, importance information recognized by a person watching the video may vary depending on whether the object included in the frame is a face or the sky. In other words, a person perceives distortion to a greater extent when distortion is included in the face than when distortion is included in the background sky. According to an embodiment of the disclosure, the high-complexity feature information obtainment unit 219 may classify the types of objects, and may obtain a high-complexity weight according to the semantic segmentation information by assigning different weights according to the meanings of the objects.

According to an embodiment of the disclosure, the high-complexity feature information obtainment unit 219 may obtain saliency map information. A saliency map may refer to a map in which a saliency region attracting people's attention is distinguished from other regions and expressed. The saliency region may refer to a region attracting a user's attention in a video frame, that is, a region having a high visual concentration. For example, the high-complexity feature information obtainment unit 219 may obtain the saliency map from the frame by using a model that has previously learned the saliency region obtained by tracking the eyes of an assessor. The model that has previously learned the saliency region may be a neural network trained to obtain a saliency map for an input video frame in consideration of a color change or distribution, edges, spatial frequency, structure, distribution, histogram, texture, and the like of each of the pixels included in the input video frame or a pixel group including a plurality of pixels having similar features. According to an embodiment of the disclosure, the high-complexity feature information obtainment unit 219 may obtain a high-complexity weight according to the semantic segmentation information by assigning a high weight to a saliency map region.

According to an embodiment of the disclosure, the electronic device 100a may obtain a feature map from the input frame and obtain the high-complexity feature information, based on the feature map, by using at least one neural network.

According to an embodiment of the disclosure, the electronic device 100a may determine whether to obtain the high-complexity feature information, in consideration of the capacity, performance, or the like of the electronic device 100a. For example, when a memory capacity included in a video quality device or the performance of a CPU or processor is sufficient to acquire the high complexity feature information, the electronic device 100a may control the high-complexity feature information obtainment unit 219 to operate. The high-complexity feature information obtainment unit 219 may obtain the high-complexity feature information by using the at least one neural network.

According to an embodiment of the disclosure, the electronic device 100a may determine whether the high-complexity feature information obtainment unit 219 operates, according to a selection of the user. For example, the user may select whether the high-complexity feature information obtainment unit 219 operates, in a menu setting function through a user interface. When the user selects to watch a video with a lower degree of distortion and a higher definition, the electronic device 100a may allow the high-complexity feature information obtainment unit 219 to operate, and thus the high-complexity feature information may be used to obtain a final score.

According to an embodiment of the disclosure, the high-complexity feature information obtainment unit 219 may obtain the high-complexity feature information and may obtain the high-complexity weight indicating the high-complexity feature information. The high-complexity feature information obtainment unit 219 may transmit the high-complexity weight to the final quality score obtainment unit 217.

The final quality score obtainment unit 217 may obtain a final quality score in which the high-complexity feature information has been reflected, by applying the high-complexity weight received from the high-complexity feature information obtainment unit 219 to the weighted assessment score for each sub-region received from the weighted assessment score obtainment unit 215.

Figure 5:
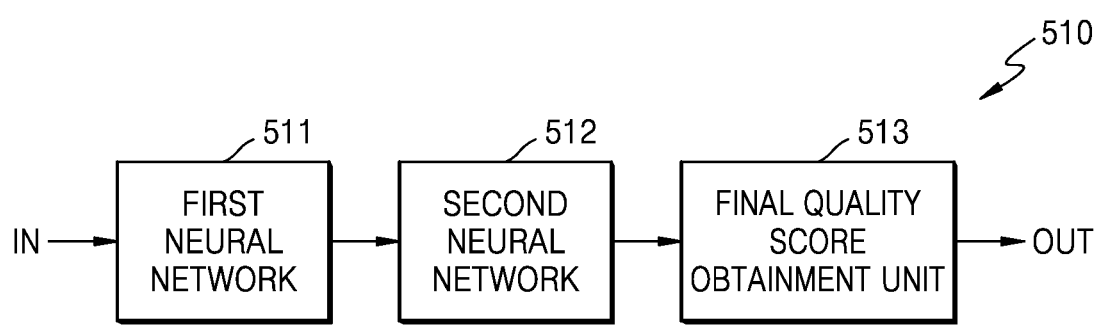
FIG. 5 is a block diagram for explaining assessment of video quality by an electronic device by using a neural network, according to an embodiment of the disclosure.

FIG. 5 is a block diagram for explaining assessment of a video quality by an electronic device by using a neural network, according to an embodiment of the disclosure.

FIG. 5 is a block diagram of an internal structure of a processor 510 included in the electronic device, and the processor 510 of FIG. 5 may be an example of the processor 210 included in the electronic device 100a of FIG. 5.

Referring to FIG. 5, the processor 510 may include a first neural network 511, a second neural network 512, and a final quality score obtainment unit 513.

According to an embodiment of the disclosure, the first neural network 511 may be an algorithm that extracts a feature from input data. According to an embodiment of the disclosure, the first neural network 511 may be a model trained to extract a quality assessment score of an image from data input by analyzing and classifying the input data. According to an embodiment of the disclosure, the first neural network 511 may be trained to receive a plurality of sub-regions included in an input frame (IN) and obtain a subjective assessment score from the plurality of sub-regions.

A plurality of assessors may assess the quality of a video and/or frames included in the video. Assessment scores for each frame obtained by assessors may be converted into subjective assessment scores (MOS) and may be used as training data for training the first neural network 511 together with a plurality of frames. According to an embodiment of the disclosure, the first neural network 511 may learn a method of predicting the subjective assessment score for each sub-region by using a plurality of pieces of training data as an input value. The first neural network 511 may receive, as a training data set, a video frame and the subjective assessment score for the video frame obtained by the assessors, and may learn a correlation between the video frame and the subjective assessment score.

According to an embodiment of the disclosure, the subjective assessment score used to train the first neural network 511 may be a subjective assessment score for the entire video frame obtained by assessors. The first neural network 511 may be repeatedly trained so that a subjective assessment score for each of a plurality of sub-regions predicted by inferring/predicting a quality score for each of the plurality of sub-regions from the video frame is equal to the subjective assessment score for the entire video frame obtained by assessors.

According to an embodiment of the disclosure, the first neural network 511 after training may be included in the electronic device 100a and may receive an input frame (IN) and may obtain a subjective assessment score for each of a plurality of sub-regions included in the input frame from the input frame.

The first neural network 511 may transmit the subjective assessment score obtained for each of the plurality of sub-regions to the second neural network 512.

According to an embodiment of the disclosure, the second neural network 512 may be an algorithm for extracting features from input data, a set of algorithms, or software and/or hardware for executing the set of algorithms.

According to an embodiment of the disclosure, the second neural network 512 may be a model trained to receive a subjective evaluation score for each sub-region of a video frame as input data, analyze and classify the input data, and obtain a location weight indicating characteristics according to the location of the display.

According to an embodiment of the disclosure, the second neural network 512 may include one or more hidden layers. Alternatively, according to an embodiment of the disclosure, the second neural network 512 may be a deep neural network (DNN) including two or more hidden layers. The second neural network 512 may have a structure in which input data is processed while passing through hidden layers and thus processed data is output. Each layer of the second neural network 512 may be represented by at least one node, and nodes between layers may be connected to each other by edges.

According to an embodiment of the disclosure, the location weight may be information indicating that a region of interest of the user watching the video varies according to the location of the display.

According to an embodiment of the disclosure, the location weight matrix may refer to a matrix for the entire frame including the location weight for each sub-region.

According to an embodiment of the disclosure, the second neural network 512 may be trained to obtain, as the location weight, a weight corresponding to a difference between a subjective assessment score for each sub-region of the video frame obtained based on a model and a subjective assessment score for the entire video frame obtained by actual assessors assessing the video frame.

According to an embodiment of the disclosure, the second neural network 512 may be trained to obtain a weighted assessment score for each sub-region in consideration of both the subjective assessment score and the location weight for each sub-region of the video frame and obtain a location weight matrix in which a mean value of the weighted assessment scores for all of the sub-regions becomes equal to the subjective assessment score for the entire video frame.

The second neural network 512 after training may be included in the electronic device 100a and may receive a subjective assessment score for each of a plurality of sub-regions obtained based on a model from the first neural network 511 and obtain a location weight from the subjective assessment score.

According to an embodiment of the disclosure, the second neural network 512 may apply the location weight to the subjective assessment score for each of the plurality of sub-regions received from the first neural network 511. According to an embodiment of the disclosure, the second neural network 512 may obtain the weighted assessment score for each sub-region by multiplying the subjective assessment score for each sub-region by the location weight for each sub-region.

The second neural network 512 may transmit a weighted assessment score matrix including the weighted assessment score of each of the plurality of sub-regions to the final quality score obtainment unit 513.

According to an embodiment of the disclosure, the final quality score obtainment unit 517 may receive the weighted assessment score matrix from the second neural network 512. The final quality score obtainment unit 513 may obtain a final quality score for the entire frame by averaging the weighted assessment scores included in the weighted assessment score matrix.

Although not shown in FIG. 5, the electronic device 100a may further include a high-complexity feature information obtainment unit. In this case, the final quality score obtainment unit 513 may receive a high-complexity weight indicating high-complexity feature information from the high-complexity feature information obtainment unit, and may apply the high-complexity weight to the weighted assessment score for each sub-region. The final quality score obtainment unit 513 may obtain a final quality score for the entire frame, based on the weighted assessment score for each sub-region to which the high-complexity weight has been applied.

According to an embodiment of the disclosure, the final quality score obtainment unit 513 may obtain a final quality score for the entire video by using the final quality score for each frame. The final quality score obtainment unit 513 may consider a temporal influence or temporal dependence related to video recognition, by using the quality scores of frames accumulated over time. According to an embodiment of the disclosure, the final quality score obtainment unit 513 may obtain a final quality score for the entire video by smoothing time-series data. The final quality score obtainment unit 513 may use a simple heuristic rule or a neural network model to smooth the time-series data. The final quality score obtainment unit 513 may obtain a final quality score for the entire video in consideration of an effect over time with respect to accumulated time-series data.

According to an embodiment of the disclosure, the final quality score obtainment unit 513 may output the final quality score for the entire video (OUT).

Figure 6:
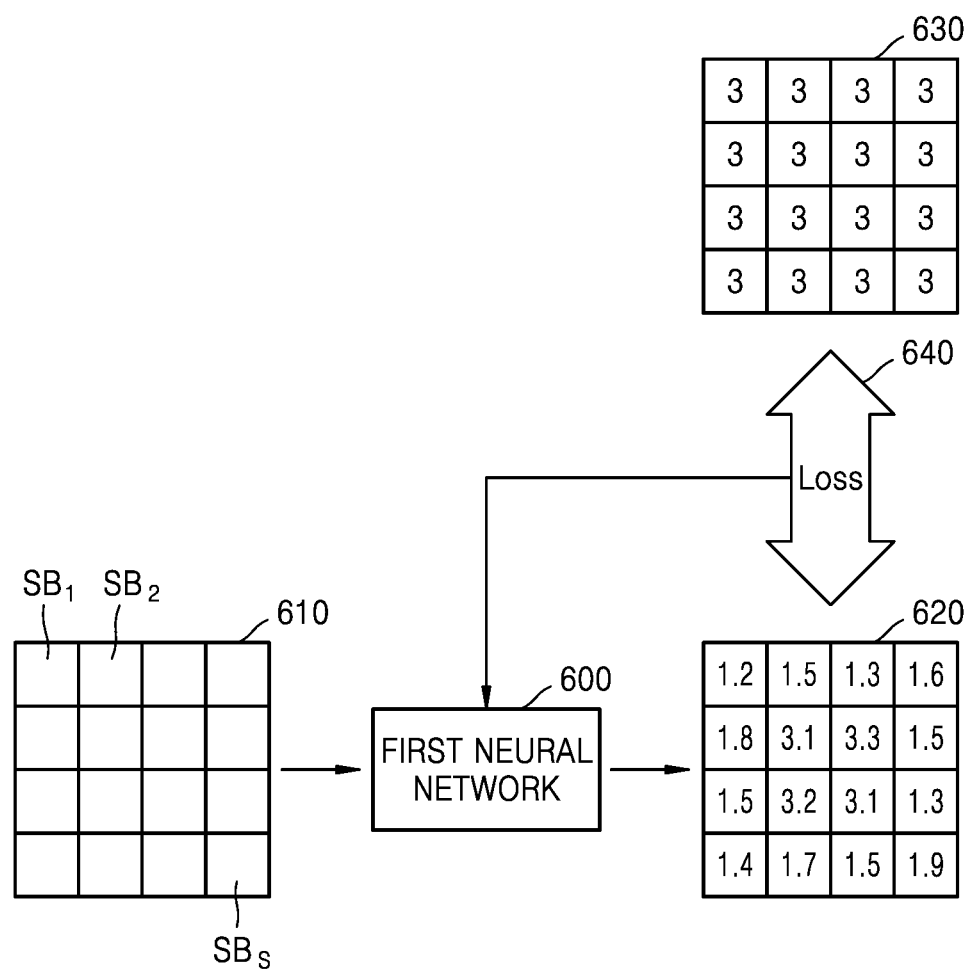
FIG. 6 is a view for explaining training of a first neural network, according to an embodiment of the disclosure.

FIG. 6 is a view for explaining training of a first neural network 600, according to an embodiment of the disclosure.

According to an embodiment of the disclosure, the first neural network 600 may be constructed as a model for obtaining a subjective assessment score from a video frame. The first neural network 600 may receive, as a training data set, a video frame and a subjective assessment score for the video frame obtained by assessors, and may learn a correlation between the video frame and the subjective assessment score.

Although not shown in FIG. 6, the first neural network 600 may include an input layer, a hidden layer, and an output layer. The hidden layer may be composed of one or more layers. Each of a plurality of layers that form the first neural network 600 may include one or more nodes. Nodes of two adjacent layers may be connected by a plurality of edges. Each layer included in the first neural network 600 may obtain a subjective assessment score from input data by performing an operation.

Referring to FIG. 6, an input frame 610 including a plurality of sub-regions SB1, SB2, . . . , and SBs may be input to the input layer of the first neural network 600.

According to an embodiment of the disclosure, the first neural network 600 may extract a feature for each sub-region from the input frame 610, and analyze and classify the feature for each sub-region to output data 620. According to an embodiment of the disclosure, the first neural network 600 may predict a subjective assessment score for each sub-region obtained by assessors, and may output a matrix including the predicted subjective assessment score to the output data 620.

According to an embodiment of the disclosure, in order to increase the accuracy of a result, the first neural network 600 may repeatedly perform training in a direction from the output layer to the input layer, based on a plurality of training data, to correct the values of the edges to increase the accuracy of an output result. In other words, the first neural network 600 may receive a loss 640 between the output data 620 and a GT MOS 630, and may continuously correct the values of the edges included in the hidden layer so that the loss 640 is minimized. The first neural network 600 may predict the subjective assessment score for each sub-region obtained by assessors by using the corrected values of the edges, and may output the predicted subjective assessment score as the output data 620.

The GT MOS 630 may refer to information known to be real or factual, provided by direct observation and/or measurement, unlike information provided by inference. The GT MOS 630 used by the first neural network 600 for training may be a subjective assessment score (MOS) for the entire input frame 610 obtained by assessors. In other words, the first neural network 600 may not use the subjective assessment score generated for each sub-region by assessors as a GT MOS, but may use a matrix having the same score as a subjective assessment score for the entire frame as the subjective assessment score for each sub-region, as the GT MOS 630. For example, in FIG. 6, when the subjective assessment score for the entire frame is 3 points, the first neural network 600 may be trained so that the loss 640 between the GT MOS 630 and the output data 620, namely, a matrix including a predicted subjective assessment score for each sub-region, is minimized, by using, as the GT MOS 630, a matrix in which the subjective assessment scores for the sub-regions are all 3 points.

As shown in FIG. 6, in the output data 620 output by the first neural network 600, an assessment score of a sub-region located at the center of the matrix including the subjective assessment scores has a score close to 3, which is a subjective assessment score, and assessment scores of sub-regions located in the vicinity have greatly different scores from 3 points. This may mean that a region of interest attracting user's attention varies according to a location of a frame. This may also mean that the region of interest attracting user's attention is a center region of the frame. For example, this may be a case in which important information attracting the user's attention is included in a center region of the input frame 610, and blur or the like with a large distortion degree is included in a border region thereof.

However, because the GT MOS 630 used for training by the first neural network 600 is a matrix including a 3-point score, which is the same as the subjective assessment score for the entire frame, as the subjective assessment score for each sub-region, the first neural network 600 may not learn that a level of interest and an assessment score that draw the user's attention vary according to a location of a sub-region of the frame. When the subjective evaluation scores, which are the output data 620 obtained through the first neural network 600, are averaged on a frame-by-frame basis, and a final quality score for the entire frame is obtained using a mean value resulting from the averaging, because an assessment score for a region other than the region of interest is also used for calculation of the mean value, the final quality score for the entire frame is far from the assessment score for the region of interest.

Figure 7:
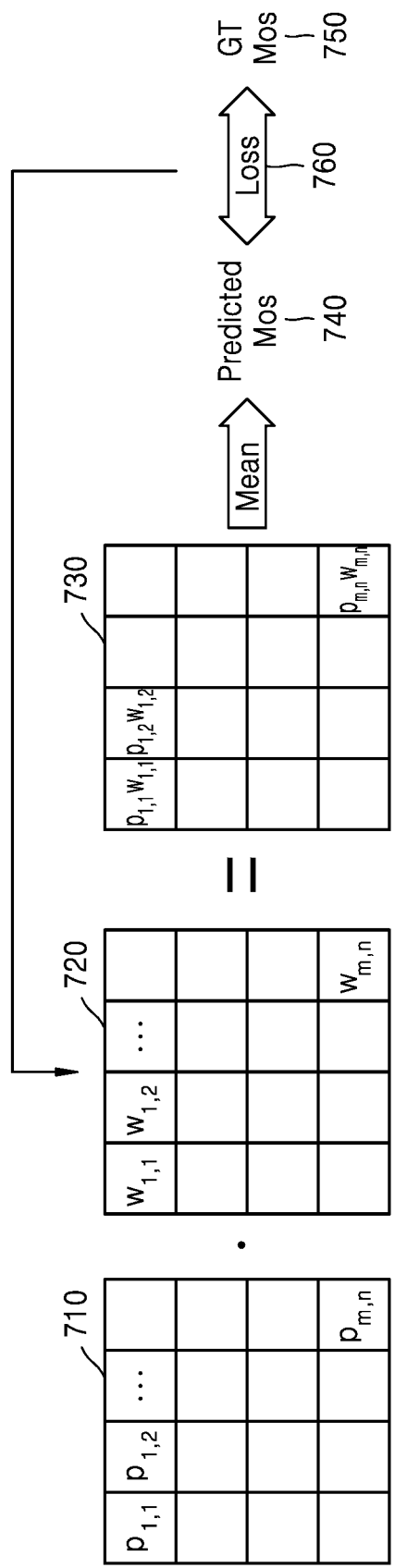
FIG. 7 is a view for explaining obtainment of a location weight matrix by a second neural network, according to an embodiment of the disclosure.

FIG. 7 is a view for explaining obtainment of a location weight matrix by a second neural network, according to an embodiment of the disclosure.

As described above, the first neural network does not learn that an assessment score varies according to the location of a sub-region of a frame. Thus, according to an embodiment of the disclosure, the second neural network may learn a weight indicating a correlation between the location of a sub-region and an assessment score. According to an embodiment of the disclosure, the second neural network after learning may infer a weight according to the location of a sub-region so that the weight according to the location is reflected in the assessment score.

According to an embodiment of the disclosure, similar to the first neural network, the second neural network may be trained using, as training data, a video frame and a subjective assessment score for the video frame obtained by assessors.

According to an embodiment of the disclosure, the second neural network may be connected to the first neural network to receive, as input data, a subjective assessment score of the video frame predicted based on a first neural network model. The second neural network may be trained to obtain a location weight indicating characteristics according to the location of a sub-region from the subjective assessment score for each sub-region of the video frame predicted based on the model and the subjective assessment score for the entire video frame obtained by assessors, namely, a GT MOS.

Referring to FIG. 7, a matrix 710 including respective subjective assessment scores for a plurality of sub-regions, obtained based on a model, may be input to an input layer of the second neural network. Assuming that each of a width and a length of a frame are divided into M and N sub-regions or patches, respectively, a total of M×N sub-regions are included in the entire frame. The matrix 710 including the model-based subjective assessment scores may include respective assessment scores for the M×N sub-regions as $p_{1,1}, p_{1,2}, \ldots,$ and $p_{m,n}$. The matrix 710 including the model-based subjective assessment scores may be output data predicted through the first neural network.

According to an embodiment of the disclosure, the second neural network may generate a location weight matrix 720 including location weights that are to be applied to sub-regions, respectively, from the matrix 710 including the model-based subjective assessment scores. The location weight matrix 720 may include location weights for the M×N sub-regions, similar to the matrix 710 including the model-based subjective assessment scores. For example, as shown in FIG. 7, the location weight matrix 720 generated by the second neural network may include the location weights that are to be applied to the sub-regions, respectively, as $w_{1,1}, w_{1,2}, \ldots,$ and $w_{m,n}$.

According to an embodiment of the disclosure, the second neural network may obtain a weighted assessment score for each sub-region from the model-based subjective assessment scores and the location weights. According to an embodiment of the disclosure, the weighted assessment score for each sub-region may be obtained by multiplying the model-based subjective assessment score for each sub-region, which is obtained through the first neural network, by the location weight for each sub-region. The second neural network may obtain the weighted assessment score for each sub-region, and may generate a weighted assessment score matrix 730 for each sub-region, based on the weighted assessment score. The weighted assessment score matrix 730 for each sub-region may include the respective weighted assessment scores $p_{1,1}w_{1,1}, p_{1,2}w_{1,2}, \ldots,$ and $p_{m,n}w_{m,n}$ for all of the sub-regions.

According to an embodiment of the disclosure, the second neural network may obtain a mean value 740 of the respective weighted assessment scores for all of the sub-regions included in the weighted assessment score matrix 730 for each sub-region. For example, the second neural network may obtain the mean value 740 of the weighted assessment scores, by summing all of the respective weighted assessment scores for all of the sub-regions and dividing a result of the summation by the number of sub-regions. The mean value 740 of the respective weighted assessment scores for all of the sub-regions may be a predicted subjective assessment score (predicted MOS) obtained by predicting, based on a model, the subjective assessment score for the frame obtained by assessors.

According to an embodiment of the disclosure, the second neural network may use the subjective assessment score for the frame obtained by assessors as a GT MOS 750.

FIG. 7 illustrates a case in which the subjective assessment score for the frame obtained by assessors is similar to assessment scores for sub-regions located at the center of the frame from among model-based subjective assessment scores predicted through the first neural network. For example, FIG. 7 illustrates a case in which the level of interest in the center region of the frame is high and the level of interest in the peripheral region thereof is low. In this case, the subjective assessment score predicted based on a model through the first neural network has a score close to the GT MOS 750 as the location of a sub-region is closer to the center, and has a score different from the GT MOS 750 as the location of a sub-region is away from the center.

According to an embodiment of the disclosure, the second neural network may learn similarity between the model-based subjective assessment score of each sub-region and the GT MOS 750 by analyzing and classifying the model-based subjective assessment score of each sub-region from the matrix 710 including the model-based subjective assessment scores, and may be trained to correct the location weight, based on the similarity. In other words, the second neural network may compare the model-based subjective assessment scores with the GT MOS 750, and may be trained so that a location weight of a sub-region having a model-based subjective assessment score having a small loss with the GT MOS 750 has a larger value and a location weight of a sub-region having a model-based subjective assessment score having a large loss with the GT MOS 750 has a smaller value. Thus, the location weights generated in correspondence with losses between the model-based subjective assessment scores and the GT MOS 750 vary according to the location of the display.

According to an embodiment of the disclosure, the second neural network may be trained so that a loss between the mean value 740 of the weighted assessment scores for all of the sub-regions and the subjective assessment score for the entire frame obtained by assessors, namely, the GT MOS 750, is minimized. The loss between the mean value 740 of the weighted assessment scores for all of the sub-regions and the GT MOS 750 may be obtained according to various criteria or scales. For example, the second neural network may assess a similarity between the mean value 740 of the weighted assessment scores for all of the sub-regions and the GT MOS 750 by using various methods such as a Mean Absolute Error (MAE), a Mean Squared Error (MSE), a Root Mean Squared Error (RMSE), a Mean Squared Log Error (MSLE), and a Mean Absolute Percentage Error (MAPE).

According to an embodiment of the disclosure, the second neural network may obtain, as the loss, a mean of the squares of differences between the mean value 740 of the weighted assessment scores for all of the sub-regions and the GT MOS 750, by using the MSE method. For example, the second neural network may obtain the loss by using Equation 1 below.

$$\text{Loss} = L(\text{Pred MOS}, \text{GT MOS}) \quad [\text{Equation 1}]$$
$$= L\left(\frac{1}{MN}\sum_{m}^{M}\sum_{n}^{N} p_{m,n} w_{m,n}, \text{GT MOS}\right)$$

In Equation 1, L may indicate that a method of obtaining a loss is an MSE, M and N may indicate the number of widths of patches included in a frame and the number of lengths of the patches included in the frame, respectively, Pred MOS indicates a model-based subjective assessment score (MOS) inferred by the first neural network, and GT MOS indicates a GT MOS MOS. In Equation 1, p may indicate an MOS, namely, a model-based subjective assessment score, for each patch, and w may indicate a location weight output by the second neural network.

According to an embodiment of the disclosure, the second neural network may obtain a loss function between the mean value 740 of the respective weighted assessment scores for all of the sub-regions and the GT MOS 750, namely, the loss 640, by using the MSE method, and may feed forward the loss 640 to receive again the loss 640. The second neural network may be trained to obtain a more accurate location weight for each sub-region by repeating a process of minimizing the loss 640 from a learning model.

As such, according to an embodiment of the disclosure, the second neural network may learn a difference between the matrix 710 including the model-based subjective assessment scores and the GT MOS 650 in a learning stage, and may be trained to generate the location weight matrix 720 representing an influence of the location of the display upon a quality score based on the difference.

According to an embodiment of the disclosure, the second neural network may be trained to differently obtain the location weight for each sub-region of the display according to a screen size. When the size of a screen is larger than a predetermined size, people mainly watch a central portion of the screen, but, when the size of the screen is not large, people tend to watch the entire region of the screen at once. Accordingly, when the screen size is smaller than the predetermined size, the user perceives distortion to an almost similar degree for the entire region of the screen. According to an embodiment of the disclosure, the second neural network may obtain the location weight for each sub-region of the display only when the screen size is equal to or greater than the predetermined size.

According to an embodiment of the disclosure, when the screen size is greater than or equal to the predetermined size, the degree of recognizing distortion between the central portion and the peripheral region also increases, as the screen size increases. Therefore, according to an embodiment of the disclosure, the second neural network may be trained to obtain the location weights for each sub-region whose difference also increases as the screen size increases, when the screen size is greater than or equal to the predetermined size.

Figure 8:
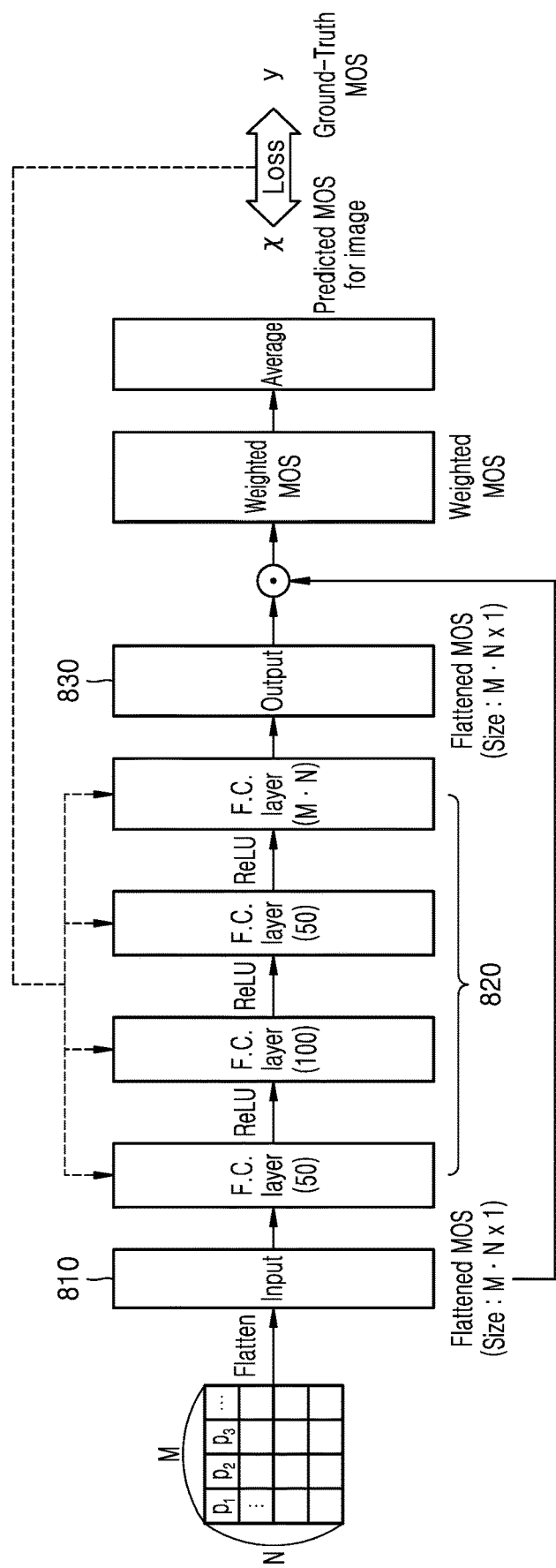
FIG. 8 is a view for explaining training of a second neural network, according to an embodiment of the disclosure.

FIG. 8 is a view for explaining training of a second neural network, according to an embodiment of the disclosure.

According to an embodiment of the disclosure, the second neural network may be a Convolution Neural Network (CNN), a Deep Convolution Neural Network (DCNN), or a Capsnet-based neural network.

According to an embodiment of the disclosure, the second neural network may be trained to discover or learn by itself a method of receiving various data and analyzing the received data, a method of analyzing the received data, a method of classifying the received data, and/or a method of extracting a feature necessary for result data generation from the received data. The second neural network may be made into an artificial intelligence model with desired characteristics, by applying a learning algorithm to a plurality of training data. Such learning may be performed in an electronic device itself, or may be performed through a separate server/system. Here, a learning algorithm is a method of training a predetermined target device (e.g., a robot) by using a plurality of training data so that the predetermined target device may make a decision or make a prediction by itself.

Examples of the learning algorithm include supervised learning, unsupervised learning, semi-supervised learning, or reinforcement learning, and the learning algorithm according to an embodiment is not limited to the above-described examples except in cases where it is specified.

For example, the second neural network may be trained with a data inference model through supervised learning by using training data as an input value. Alternatively, the second neural network may be trained with the data inference model through unsupervised learning to find a criterion for location weight determination, by self-learning a type of data necessary for location weight determination without special supervision. Alternatively, the second neural network may be trained with the data inference model through reinforcement learning using a feedback regarding whether a result of inferring a location weight according to learning.

Referring to FIG. 8, the second neural network may include an input layer 810, a hidden layer 820, and an output layer 830. According to an embodiment of the disclosure, the hidden layer 820 may include a plurality of hidden layers. The second neural network may include one or more hidden layers. For example, the second neural network may be a deep neural network (DNN) including two or more hidden layers. The DNN is a neural network that performs an operation through a plurality of layers, and a depth of the network may increase according to the number of internal layers that perform the operation. A DNN operation may include a convolution neural network (CNN) operation and the like.

For example, the second neural network may include a first layer formed between the input layer 810 and a first hidden layer, a second layer formed between the first hidden layer and a second hidden layer, a third layer formed between the second hidden layer and a third hidden layer, a fourth layer formed between the third hidden layer and a fourth hidden layer, and a fifth layer formed between the fourth hidden layer and the output layer 830. However, according to an embodiment, the depth or shape of the layer of the second neural network may be designed in various ways in consideration of the accuracy of a result, the reliability of the result, the processing speed and capacity of a processor, and the like.

Each of a plurality of layers that form the second neural network may include one or more nodes. For example, the input layer 810 may include one or more nodes that receive data. The number of nodes included in the input layer 810 of the second neural network is the same as the number of nodes included in the output layer 830. FIG. 8 illustrates a case in which the number of nodes in the first hidden layer included in the second neural network is 50, the number of nodes in the second hidden layer included in the second neural network is 100, and the number of nodes in the third hidden layer included in the second neural network is 50. However, this is merely an embodiment, and the number of nodes of the second neural network may be designed in various ways.

According to an embodiment of the disclosure, a subjective assessment score obtained based on a model may be input to a plurality of nodes included in the input layer 810. Nodes of two adjacent layers may be connected to a plurality of edges. Each of the edges has a corresponding weight value and operation information such as multiplication or addition. The second neural network may perform an operation by multiplying or adding the weight value of an edge by or to input data, and may output a result of the operation as a node value of a next layer connected to the edge. According to an embodiment of the disclosure, the layers included in the second neural network may be formed as a fully connected layer in which all nodes of a previous layer are connected to all of the nodes of the next layer.

The second neural network passes the values input to a node pass through a function and then transmits the values to a next layer. In this case, a function that determines output of the next layer is called an activation function. The activation function may be a function that determines how to transmit the input data to the next layer. According to an embodiment of the disclosure, the second neural network may use a Rectified Linear Unit (ReLU) as an activation function that is used in a hidden layer. The ReLU is one of nonlinear activation functions, and allow fast training and simple implementation. However, embodiments of the disclosure are not limited thereto, and the second neural network may use another nonlinear activation function such as a sigmoid or hyperbolic tangent/Tang function. Alternatively, the second neural network may use a binary activation function or a linear activation function instead of a nonlinear function, as an activation function.

According to an embodiment of the disclosure, the second neural network may receive a model-based subjective assessment score through the nodes included in the input layer 810, perform an operation between the layers with respect to input data, and obtain a result of the operation as output data. In other words, the second neural network may analyze and classify the input data and extract a feature necessary for generating a location weight matrix, thereby outputting the location weight matrix as the output data.

According to an embodiment of the disclosure, in order to increase the accuracy of a result, the second neural network may repeatedly perform training in a direction from the output layer 830 to the input layer 810, based on a plurality of training data, to correct weight values to increase the accuracy of an output result.

According to an embodiment of the disclosure, the second neural network may obtain a weighted assessment score (weighted MOS) for each sub-region by performing the inner product on a location weight matrix output by the output layer 830 and a matrix including subjective assessment scores obtained based on a model, and may obtain, as a loss function, a difference between a mean value x of the respective weighted assessment scores for all of the sub-regions and the GT MOS, namely, a subjective assessment score y for a frame obtained by assessors. The second neural network may receive the loss function again, and may continue to correct weight values of edges included in the hidden layer 820 so that the loss function is minimized. The weight values of the edges may be optimized through iterative learning, and may be iteratively corrected until the accuracy of a result satisfies a predetermined reliability level. The second neural network may be formed by the weight values of finally set edges.

According to an embodiment of the disclosure, an operation of learning a method of obtaining a location weight from the model-based subjective evaluation score by using the second neural network may be performed in advance before being mounted in an electronic device. When some of a plurality of training data are changed, a learning model may also be updated. In units of a predetermined cycle, when new training data is used or added, the second neural network may re-learn the method of obtaining a location weight from the new training data, and accordingly, the learning model may be updated.

According to an embodiment of the disclosure, the operation of learning the method of obtaining a location weight from the model-based subjective evaluation score by using the second neural network may be performed by an external computing device. The operation of learning the method of obtaining a location weight from the subjective evaluation score by using the second neural network may need a relatively complex computation amount. Accordingly, the computing device may perform a learning operation, and the electronic device may receive the learning model from the computing device through a communication network. Alternatively, a manufacturer of the electronic device may mount the second neural network learned by the computing device on the electronic device so that the learning model is used by the electronic device to obtain a weight.

Alternatively, according to another embodiment of the disclosure, the electronic device, not the computing device, may directly perform the learning operation through the second neural network. In this case, the electronic device may obtain training data and train the second neural network by using the training data to determine a learning model, and may obtain a position weight through the determined learning model.

Figure 9:
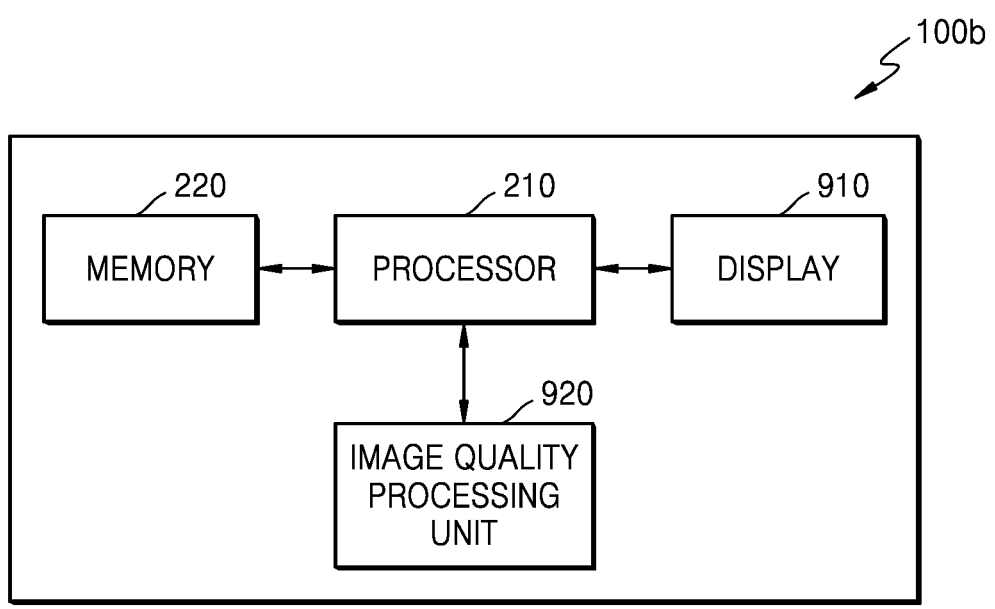
FIG. 9 is a block diagram of an internal structure of an electronic device, according to an embodiment of the disclosure.

FIG. 9 is a block diagram of an internal structure of an electronic device 100b, according to an embodiment of the disclosure.

The electronic device 100b of FIG. 9 may be an example of the electronic device 100a of FIG. 2.

Referring to FIG. 9, the electronic device 100b may include the processor 210, the memory 220, a display 910, and an image quality processing unit 920. Functions performed by the processor 210 and the memory 220 included in the electronic device 100b of FIG. 9 may include functions performed by the processor 210 and the memory 220 of FIG. 2, and thus duplicate descriptions will be omitted.

The processor 210 controls operations of the electronic device 100b. The processor 210 may measure a quality of a corresponding video before outputting, on a screen, a broadcast program received in real time or a program of a VOD service received by streaming or downloading.

The processor 210 may obtain a model-based subjective assessment score and obtain a location weight matrix, for each sub-region of an input frame. The processor 210 may obtain a weight assessment score for each sub-region by applying the location weight matrix to the subjective assessment score, and may obtain a final quality score for an input frame, based on the obtained weight assessment score. Also, the processor 210 may accumulate a quality score for each frame for a certain period of time, obtain time-series data for a plurality of frames, and obtain a final quality score for a video.

According to an embodiment of the disclosure, the image quality processing unit 920 may process the image quality of a frame. According to an embodiment of the disclosure, the image quality processing unit 920 may correct an image, based on a final quality score for the frame. Correcting an image, based on a final quality score may refer to performing post-processing for each frame by correcting a post-processing setting value on a frame-by-frame basis. For example, the image quality processing unit 920 may adaptively improve the quality of the frame by removing noise included in the frame, or improve the quality of the frame by more vividly correcting the details included in the frame, according to the final quality score. Alternatively, the image quality processing unit 920 may improve the quality of the frame by creating a high-resolution image via a combination of several images or by performing one or a combination of two or more from among various post-processing methods such as adjusting a frame per second (FPS).

Alternatively, according to an embodiment of the disclosure, the image quality processing unit 920 may process the image quality of each frame or the entire video by using an appropriate AI model, according to the final score of a frame or video. For example, the image quality processing unit 920 may select an image restoration model from among a plurality of neural network models according to a score for each frame or a final quality score of the entire video, or may directly design the image restoration model. The image quality processing unit 920 may improve the quality of a frame/video by determining the number of times to apply an image quality processing model according to the quality score, and repeatedly applying the image quality processing model to the frame by the determined number of times.

Alternatively, the image quality processing unit 920 may design a filter such as a BPF or an HPF of which a bandwidth varies according to the quality score of the frame or video, and may change a signal of a predetermined band of the frame or video by using the filter to thereby improve the quality of the frame/video.

Alternatively, the image quality processing unit 920 may generate a model having an optimal performance by correcting at least one of various hyperparameter values, such as a filter size, a filter coefficient, a kernel size, and weight values of nodes, used in a neural network according to a score for each frame or a final score of the video. The image quality processing unit 920 may optimally improve image quality of the frame or video by using an AI model having such corrected hyperparameters.

According to an embodiment of the disclosure, the electronic device 100b may send a processed frame and a processed video obtained by the image quality processing unit 920 to the display 910. The display 910 may output the processed frame and the processed video. When the display 910 is implemented as a touch screen, the display 910 may be used as an input device, such as a user interface, as well as an output device. For example, the display 910 may include at least one of a liquid crystal display (LCD), a thin film transistor-LCD (TFT-LCD), an organic light-emitting diode (OLED), a flexible display, a three-dimensional (3D) display, or an electrophoretic display. According to embodiments of the electronic device 100b, the electronic device 100b may include two or more displays 910.

As such, according to an embodiment of the disclosure, the electronic device 100b may obtain a quality score for the frame and post-process the frame and/or video using the obtained quality score. The electronic device 100b may select an image restoration model suitable for each frame or the entire video, based on the quality score, and may improve the quality of each frame or the video by using the selected image restoration model. A frame or video with improved quality may be output through the display 910.

Figure 10:
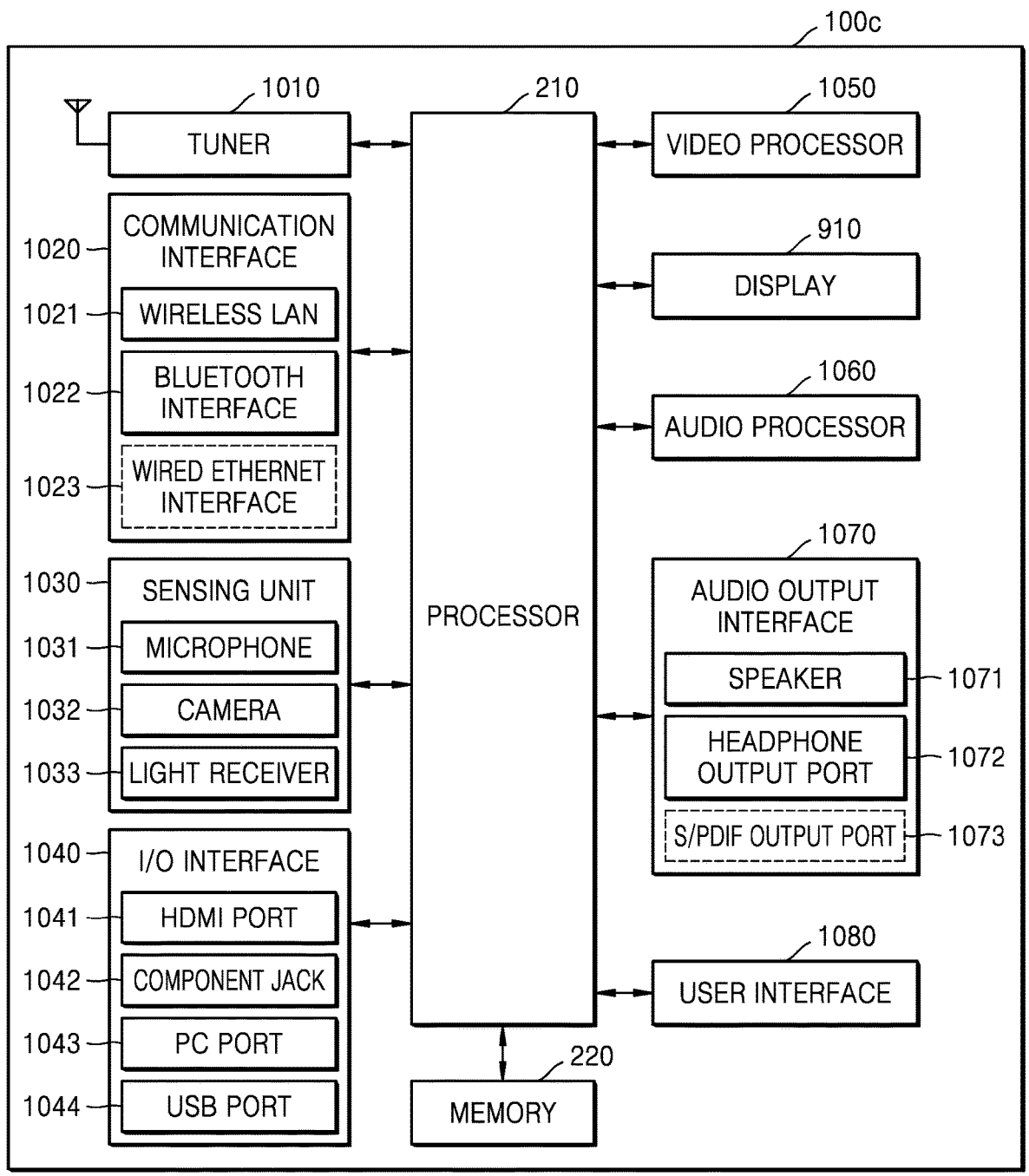
FIG. 10 is a block diagram of an internal structure of an electronic device, according to an embodiment of the disclosure.

FIG. 10 is a block diagram of an internal structure of an electronic device 100c, according to an embodiment of the disclosure.

The electronic device 100c of FIG. 10 may include the components of the electronic device 100b of FIG. 9.

Referring to FIG. 10, the electronic device 100c may include a tuner 1010, a communication interface 1020, a sensor 1030, an input/output (I/O) interface 1040, a video processor 1050, an audio processor 1060, an audio output interface 1070, and a user interface 1080 in addition to the processor 210, the memory 220, and the display 910.

The tuner 1010 may tune and select only a frequency of a channel which the electronic device 1100 wants to receive from among many radio wave components that are obtained via amplification, mixing, resonance, or the like of wired or wireless broadcasting contents. Contents received through the tuner unit 1010 are decoded and separated into audio, video, and/or additional information. The audio, the video, and/or the additional information may be stored in the memory 220 under the control by the processor 210.

The communication interface 1020 may connect the electronic device 100c to an external device or a server under the control by the processor 210. The electronic device 100c may download a program or application required by the electronic device 100c from the external device or server or perform web browsing, through the communication interface 1020. The communication interface 1020 may receive the contents from the external device.

The communication interface 1020 may include at least one of a wireless local area network (LAN) 1021, a Bluetooth network 1022, or a wired Ethernet network 1023 in correspondence to a performance and a structure of the electronic device 100c. The communication interface 1020 may receive a control signal through a control device such as a remote controller, under the control by the processor 210. The control signal may be implemented as a Bluetooth signal, a radio frequency (RF) signal, or a Wi-Fi signal. The communication interface 1020 may further include short-range communication (for example, NFC or Bluetooth low energy (BLE)), in addition to the Bluetooth network 1022. The communication interface 1020 may transmit or receive a connection signal to or from an external device or the like through the Bluetooth network 1022 or the short-range communication such as BLE.

The sensor 1030 senses a voice of a user, an image of the user, or an interaction with the user, and may include a microphone 1031, a camera 1032, and a light receiver 1033. The microphone 1031 may receive a voice uttered by a user, transform the received voice into an electrical signal, and output the electrical signal to the processor 210. The camera 1032 may include a sensor and a lens, and may capture an image formed on a screen. The light receiver 1033 may receive an optical signal (including a control signal). The light receiver 1033 may receive an optical signal corresponding to a user input (for example, touch, pressing, a touch gesture, a voice, or a motion) from the control device such as a remote controller or a mobile phone. A control signal may be extracted from the received optical signal under the control by the processor 210.

The I/O interface 1040 may receive video (for example, a moving picture signal or a still image signal), audio (for example, a voice signal or a music signal), and additional information (for example, metadata) from an apparatus outside the electronic device 100c under the control by the processor 210. The metadata may include HDR information about the contents, a description or content title for the contents, a content storage location, and the like. The I/O interface 1040 may include a High-Definition Multimedia Interface (HDMI) port 1041, a component jack 1042, a PC port 1043, or a USB port 1044. The I/O interface 1040 may include a combination of the HDMI port 1041, the component jack 1042, the PC port 1043, and the USB port 1044.

The video processor 1050 may process image data that is to be displayed on the display 1030, and may perform a variety of image processing, such as decoding, rendering, scaling, noise filtering, frame rate transformation, and resolution transformation, on the image data.

According to an embodiment of the disclosure, the video processor 1050 may perform a function of the image quality processing unit 920 of FIG. 10. In other words, the video processor 1050 may improve the quality of the video and/or the frame, based on the frame-by-frame score or the final quality score of the entire video obtained by the processor 210.

The display 910 may output contents received from a broadcasting station or received from an external server or an external storage medium to the screen. The contents is a media signal, and may include a video signal, an image, a text signal, and the like. The display 910 may display, on the screen, a video signal or an image received through the HDMI port 1041.

According to an embodiment of the disclosure, when the video processor 1050 improves the quality of the video or frame, the display 910 may output a video or frame of an improved quality.

When the display 910 is implemented as a touch screen, the display 910 may be used as an input device as well as an output device. According to embodiments of the electronic device 100c, the electronic device 100c may include two or more displays 910.

The audio processor 1060 processes audio data. The audio processor 1060 may perform a variety of processing, such as decoding, amplification, or noise filtering, on the audio data.

The audio output interface 1070 may output audio included in the contents received via the tuner 1010, audio that is input via the communication interface 1020 or the I/O interface 1040, and audio stored in the memory 220 under the control by the processor 210. The audio output interface 1070 may include at least one selected from a speaker 1071, a headphone output port 1072, and a Sony/Philips Digital Interface (S/PDIF) output port 1073.

The user interface 1080 may receive a user input for controlling the electronic device 100c. The user interface 1080 may include, but is not limited to, various types of user input devices including a touch panel for sensing a user's touch, a button for receiving a user's push operation, a wheel for receiving a user's rotation operation, a keyboard, a dome switch, a microphone for voice recognition, and a motion detection sensor. When the electronic device 100c is manipulate by a remote controller, the user interface 1080 may receive a control signal from the remote controller.

Figure 11:
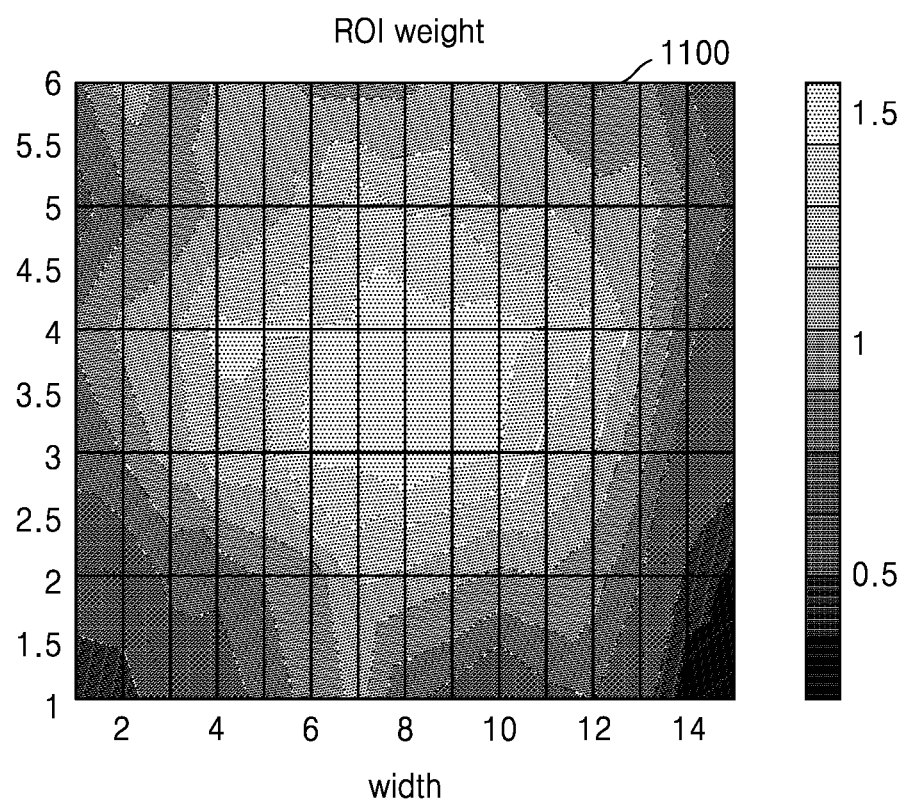
FIG. 11 is a diagram of location weights according to an embodiment of the disclosure.

FIG. 11 is a diagram of location weights according to an embodiment of the disclosure.

Because people usually tend to look at the center portion of a screen more than the edge portions thereof, a region of interest may vary according to a location of the screen. The region of interest varying according to the location of the screen may mean that, even when the degree of distortion is the same, people may perceive the degree of distortion differently when there is distortion at the center portion of the screen and when there is distortion at the edge portions of the screen. In other words, people may more greatly recognize a case in which there is distortion at the center portion of the screen than a case in which there is distortion at the edge portion of the screen, and may give a low quality score. Accordingly, a quality score may vary according to the location of the screen.

According to an embodiment of the disclosure, the second neural network may obtain a location weight indicating an influence of the location of the screen upon the quality score. The second neural network may obtain a location weight for each sub-region, and may generate a location weight matrix for the entire frame by using the location weight.

FIG. 11 expresses location weights at corresponding locations on a frame 1100. The frame 1100 may be expressed with a horizontal axis as a width and a vertical axis as a height. The frame 1100 may be divided into a plurality of sub-regions. For example, FIG. 11 shows that the horizontal axis and the vertical axis of the frame 1100 are divided into 14 and 6 sub-regions, respectively.

In FIG. 11, it is assumed that the location weight has a weight between 0 and 1.5. As shown in FIG. 11, it may be seen that a central portion of the frame 1100 has a larger weight and a peripheral portion thereof has a smaller weight. In other words, it may be seen that the central portion of the frame 1100 has a weight close to 1.5 and the peripheral portion of the frame 1100 has a weight close to 0. A location weight of a center region having a larger value may mean that the center region is a region of interest. Conversely, a location weight of a surrounding area having a smaller value may mean that the degree to which people consider the surrounding area to be important is low.

According to an embodiment of the disclosure, the second neural network may generate a weighted assessment score for each sub-region by multiplying a location weight for each sub-region by a model-based subjective assessment scores obtained for each sub-region. Therefore, according to an embodiment of the disclosure, when a quality score for the frame 1100 is obtained, a more accurate quality score in which an influence of a location upon the quality score has been reflected may be obtained by using a location weight together a subjective assessment score instead of using only the subjective evaluation score.

Table 1 below shows, as indices, quality assessment results in a case in which the second neural network is used and a case in which the second neural network is not used.

TABLE 1

| Index | PLCC | SROCC |
|---|---|---|
| Second neural network is not used | 0.757. | 0.743. |
| Second neural network is used | 0.789. | 0.775. |

In Table 1 above, PLCC and SROCC are indices indicating the performance of frame/video quality assessment technology, and thus are indices expressing correlation with assessors' subjective evaluation scores. PLCC is an acronym of a Pearson linear correlation coefficient, and may represent an overall linear relationship between a score according to a video quality assessment technique and a subjective assessment score of actual assessors. SROCC is an acronym of a Spearman rank-order correlation coefficient, and assesses the degree of rank retention between the score according to the video quality assessment techniques and the subjective evaluation score of assessors. The two indexes have values between 0 and 1 based on absolute values, and mean that, the closer the value is to 1, the higher a statistical similarity between the score according to the video quality assessment technique and perceived quality data of actual assessors is.

As shown in Table 1 above, it may be seen that, in video quality assessment, the scores in both the PLCC and SROCC indices increase when the second neural network is used compared with when the second neural network is not used. Therefore, according to the embodiment of the disclosure, quality assessment performance is greatly improved by using the second neural network with a low computational amount.

Figure 12:
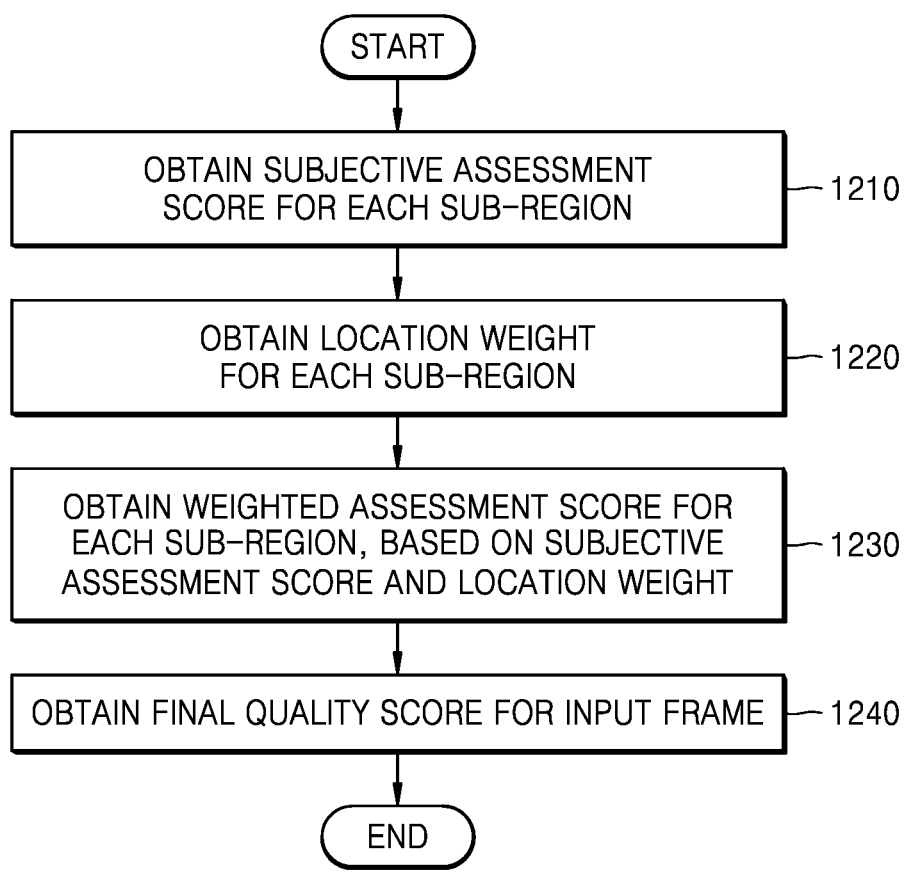
FIG. 12 is a flowchart of a video quality assessment method according to an embodiment of the disclosure.

FIG. 12 is a flowchart of a video quality assessment method according to an embodiment of the disclosure.

Referring to FIG. 12, an electronic device may obtain a subjective assessment score for each sub-region (operation 1210).

For example, the electronic device may obtain, from a frame including a plurality of sub-regions, a subjective assessment score for each of the plurality of sub-regions by using a first neural network. The first neural network may be a neural network trained to receive a video frame and infer a subjective assessment score, namely, an MOS, for each sub-region of the video frame from the video frame. According to an embodiment of the disclosure, the first neural network may be a neural network trained so that the subjective assessment score for each sub-region output as output data is equal to a subjective evaluation score for the entire video frame obtained by assessors.

According to an embodiment of the disclosure, the electronic device may obtain a location weight for each sub-region (operation 1220).

For example, the electronic device may input the subjective assessment score for each of the plurality of sub-regions obtained through the first neural network to the second neural network, and may obtain the location weight from the second neural network. According to an embodiment of the disclosure, the second neural network may be a neural network trained to receive a subjective assessment score for each sub-region of the video frame obtained based on a model and obtain, as the location weight, a weight corresponding to a difference between input data and a subjective assessment score for the entire video frame. According to an embodiment of the disclosure, the second neural network may be a neural network trained so that a mean value of the respective weighted assessment scores for all of the sub-regions obtained by multiplying the model-based subjective assessment score by the location weight is equal to a subjective assessment score (GT MOS) for the entire video frame obtained by assessors.

As another example, the location weight may be previously stored in the electronic device or may be received from an external server through a communication network. The electronic device may extract and use a pre-stored location weight matrix from a memory or the like, or may receive and use the pre-stored location weight matrix from a server.

According to an embodiment of the disclosure, the electronic device may obtain a weighted assessment score for each sub-region, based on the subjective assessment score and the location weight (operation 1230).

For example, the electronic device may multiply the model-based subjective assessment score by the weight light to thereby obtain, as the weighted assessment score for each sub-region, a model-based subjective assessment score to which the location weight has been applied.

According to an embodiment of the disclosure, the electronic device may obtain a final quality score for an input frame, based on the weighted assessment score for each sub-region (operation 1240).

For example, the electronic device may obtain the mean value of the respective weighted assessment scores for all of the sub-regions and may obtain the mean value as the final quality score for the input frame.

Figure 13:
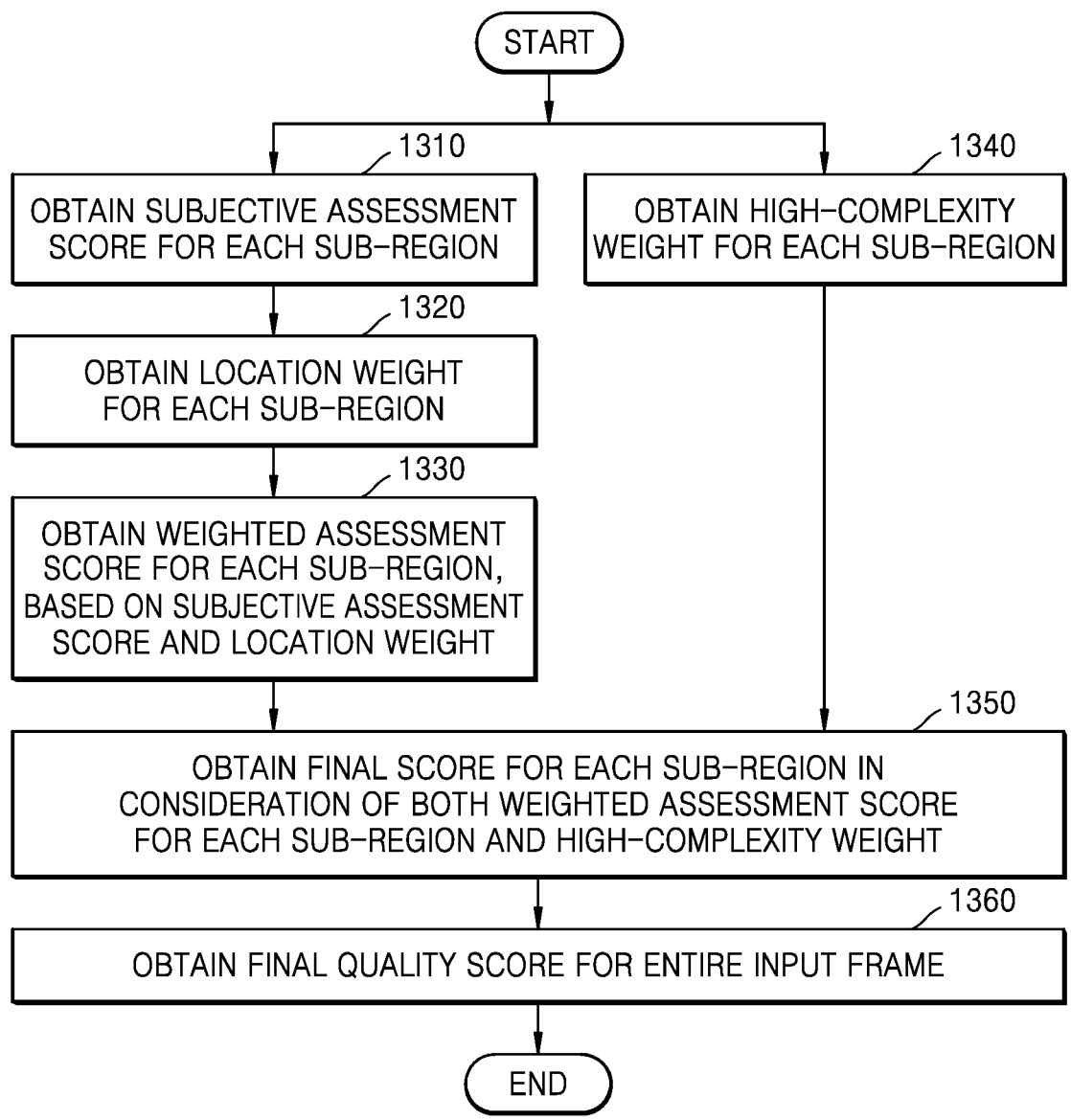
FIG. 13 is a flowchart of a method of performing video quality assessment in consideration of a high-complexity weight, according to an embodiment of the disclosure.

FIG. 13 is a flowchart of a method of performing video quality assessment in consideration of a high-complexity weight, according to an embodiment of the disclosure.

Referring to FIG. 13, an electronic device may obtain a subjective assessment score for each sub-region (operation 1310), and may obtain a location weight for each sub-region (operation 1320).

According to an embodiment of the disclosure, the electronic device may obtain a weighted assessment score for each sub-region, based on the subjective assessment score and the location weight (operation 1330).

According to an embodiment of the disclosure, the electronic device may further take high-complexity feature information into account in addition to the location weight in order to obtain a quality score.

According to an embodiment of the disclosure, the electronic device may obtain a feature map from the input frame and obtain the high-complexity feature information, based on the feature map, by using at least one neural network.

The high-complexity feature information may refer to information that requires a high amount of computation and a high complexity to obtain feature information. For example, the high-level feature information may include at least one of speaker identification information, semantic segmentation information, object detection information, or saliency map information obtained from an input frame.

According to an embodiment of the disclosure, when the electronic device determines to obtain the high-complexity feature information, the electronic device may obtain a high-complexity weight indicating a high-complexity feature for a region of interest (operation 1340).

According to an embodiment of the disclosure, the electronic device may obtain a final score for each sub-region in consideration of both the weighted assessment score for each sub-region and the high-complexity weight (operation 1350). For example, the electronic device may obtain a final score for each sub-region by multiplying the weighted assessment score for each sub-region by the high-complexity weight.

According to an embodiment of the disclosure, the electronic device may obtain a final quality score for the entire input frame, based on the final score for each sub-region (operation 1360).

Video quality assessment methods and apparatuses according to some embodiments can be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include both computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium.

A term "unit" used herein may be a hardware component such as a processor or circuit, and/or a software component executed by a hardware component such as a processor.

An electronic device for performing video quality assessment, and an operation method of the electronic device, according to an embodiment of the disclosure, may be implemented as a computer program product including a computer-readable recording medium having recorded thereon a program for realizing the video quality assessment including the operations of obtaining a subjective assessment score, namely, an MOS, for each of a plurality of sub-regions included in an input frame, obtaining, for each of the plurality of sub-regions, a location weight indicating characteristics according to the location of a display, obtaining a weighted assessment score, based on the subjective assessment score and the location weight, and obtaining a final quality score for the entire input frame, based on the weighted assessment score.

Although embodiments have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

What is claimed is:

1. An electronic device comprising:
a memory storing one or more instructions; and
a processor configured to execute the one or more instructions stored in the memory to:
obtain a subjective assessment score for each of a plurality of sub-regions included in an input frame, the subjective assessment score being a Mean Opinion Score (MOS);
obtain a location weight for each of the plurality of sub-regions based on the subjective assessment score for each of the plurality of sub-regions and a subjective assessment score for the input frame, the location weight indicating characteristics according to a location of a display;
obtain a weighted assessment score for each of the plurality of sub-regions, based on the subjective assessment score for each of the plurality of sub-regions and the location weight for each of the plurality of sub-regions; and
obtain a final quality score for the entire input frame, based on the weighted assessment score for each of the plurality of sub-regions.

2. The electronic device of claim 1, wherein the processor is further configured to execute the one or more instructions to predict the subjective assessment score for each of the plurality of sub-regions included in the input frame, by using a first neural network trained to learn, from a video frame received, a subjective assessment score for each of the plurality of sub-regions included in the video frame.

3. The electronic device of claim 2, wherein the first neural network is trained to allow the subjective assessment score for each of the plurality of sub-regions included in the input frame to be equal to a Ground Truth (GT) subjective assessment score for the entire input frame, the GT subjective assessment score being a GT MOS.

4. The electronic device of claim 2, wherein the processor is further configured to execute the one or more instructions to predict the location weight for each of the plurality of sub-regions from the subjective assessment score for each of the plurality of sub-regions by using a second neural network, and
the second neural network is trained to predict a weight corresponding to a difference between the subjective assessment score for each sub-region and a Ground Truth (GT) subjective assessment score for the entire input frame as the location weight for each sub-region, from the subjective assessment score for each of the plurality of sub-regions included in the input frame predicted through the first neural network.

5. The electronic device of claim 4, wherein the second neural network is trained to allow a mean value of weighted assessment scores obtained by multiplying the subjective assessment score for each of the plurality of sub-regions included in the input frame by the location weight to be equal to the GT subjective assessment score for the entire input frame.

6. The electronic device of claim 1, wherein the processor is further configured to execute the one or more instructions to obtain the location weight for each of the plurality of sub-regions from the memory.

7. The electronic device of claim 6, wherein the location weight for each of the plurality of sub-regions is predicted through a second neural network and stored in the memory, and
the second neural network is trained to predict a weight corresponding to a difference between the subjective assessment score for each sub-region and a Ground Truth (GT) subjective assessment score for the entire input frame as the location weight for each sub-region, from the subjective assessment score for each of the plurality of sub-regions included in the input frame received, and the second neural network is trained to allow a mean value of weighted assessment scores obtained by multiplying the subjective assessment score for each of the plurality of sub-regions by the location weight to be equal to the GT subjective assessment score for the entire input frame.

8. The electronic device of claim 1, wherein the processor is further configured to execute the one or more instructions to obtain the weighted assessment score for each respective sub-region of the plurality of sub-regions by multiplying the subjective assessment score for the respective sub-region by the location weight for the respective sub-region.

9. The electronic device of claim 1, wherein the processor is further configured to execute the one or more instructions to:
obtain high-complexity information indicating a region of interest from the input frame; and
obtain the final quality score for the entire input frame based on the weighted assessment score and the high-complexity information.

10. The electronic device of claim 9, wherein the high-complexity information includes at least one of speaker identification information, semantic segmentation information, object detection information, or saliency map information.

11. A video quality assessment method performed by an electronic device, the video quality assessment method comprising:
obtaining a subjective assessment score for each of a plurality of sub-regions included in an input frame, the subjective assessment score being a Mean Opinion Score (MOS);
obtaining a location weight for each of the plurality of sub-regions based on the subjective assessment score for each of the plurality of sub-regions and a subjective assessment score for the input frame, the location weight indicating characteristics according to a location of a display;
obtaining a weighted assessment score for each of the plurality of sub-regions, based on the subjective assessment score for each of the plurality of sub-regions and the location weight for each of the plurality of sub-regions; and
obtaining a final quality score for the entire input frame, based on the weighted assessment score for each of the plurality of sub-regions.

12. The video quality assessment method of claim 11, wherein the obtaining of the subjective assessment score for each of the plurality of sub-regions included in the input frame comprises predicting the subjective assessment score for each of the plurality of sub-regions, by using a first neural network trained to learn, from a video frame received a subjective assessment score for each of the plurality of sub-regions included in the video frame.

13. The video quality assessment method of claim 12, wherein the first neural network is trained to allow the subjective assessment score for each of the plurality of sub-regions included in the input frame to be equal to a Ground Truth (GT) subjective assessment score for the entire input frame, the GT subjective assessment score being a GT MOS.

14. The video quality assessment method of claim 12, wherein the obtaining of the location weight for each of the plurality of sub-regions comprises predicting the location weight for each of the plurality of sub-regions from the subjective assessment score for each of the plurality of sub-regions by using a second neural network, and the second neural network is trained to predict a weight corresponding to a difference between the subjective assessment score for each sub-region and a Ground Truth (GT) subjective assessment score for the entire input frame as the location weight for each sub-region, from the subjective assessment score for each of the plurality of sub-regions included in the input frame predicted through the first neural network.

15. The video quality assessment method of claim 14, wherein the second neural network is trained to allow a mean value of weighted assessment scores obtained by multiplying the subjective assessment score for each of the plurality of sub-regions included in the input frame by the location weight to be equal to the GT subjective assessment score for the entire input frame.

16. The video quality assessment method of claim 11 wherein the obtaining of the location weight for each of the plurality of sub-regions comprises obtaining the location weight for each of the plurality of sub-regions from a memory included in the electronic device.

17. The video quality assessment method of claim 16, further comprising predicting the location weight for each of the plurality of sub-regions through a second neural network and storing the location weight for each of the plurality of sub-regions in the memory,
wherein the second neural network is trained to that predict a weight corresponding to a difference between the subjective assessment score for each sub-region and Ground Truth (GT) subjective assessment score for the entire input frame as the location weight for each sub-region from the subjective assessment score for each of the plurality of sub-regions included in the input frame received, and the second neural network is trained to allow a mean value of weighted assessment scores for each of the plurality of sub-regions obtained by multiplying the subjective assessment score for each of the plurality of sub-regions by the location weight to be equal to the GT subjective assessment score for the entire input frame.

18. The video quality assessment method of claim 11, wherein the obtaining of the weighted assessment score for each of the plurality of sub-regions comprises obtaining the weighted assessment score for each respective sub-region of the plurality of sub-regions by multiplying the subjective assessment score for the respective sub-region by the location weight for the respective sub-region.

19. The video quality assessment method of claim 11, further comprising obtaining high-complexity information indicating a region of interest from the input frame,
wherein the obtaining of the final quality score comprises obtaining the final quality score for the entire input frame based on the weighted assessment score and the high-complexity information.

20. A non-transitory computer-readable recording medium having recorded thereon a program for executing a video quality assessment method, the video quality assessment method comprising:
obtaining a subjective assessment score for each of a plurality of sub-regions included in an input frame;
obtaining a location weight for each of the plurality of sub-regions based on the subjective assessment score for each of the plurality of sub-regions and a subjective assessment score for the input frame, the location weight indicating characteristics according to a location of a display;
obtaining a weighted assessment score for each of the plurality of sub-regions, based on the subjective assessment score for each of the plurality of sub-regions and the location weight for each of the plurality of sub-regions; and
obtaining a final quality score for the entire input frame, based on the weighted assessment score for each of the plurality of sub-regions.

* * * * *